(12) United States Patent
Yanagisawa et al.

(10) Patent No.: US 7,042,919 B2
(45) Date of Patent: May 9, 2006

(54) EXCITATION MODULE, LASER OSCILLATOR, AND LASER AMPLIFIER

(75) Inventors: Takayuki Yanagisawa, Tokyo (JP); Yoshihito Hirano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 325 days.

(21) Appl. No.: 10/343,938

(22) PCT Filed: Jun. 21, 2001

(86) PCT No.: PCT/JP01/05316

§ 371 (c)(1),
(2), (4) Date: Feb. 5, 2003

(87) PCT Pub. No.: WO03/001634

PCT Pub. Date: Jan. 3, 2003

(65) Prior Publication Data

US 2004/0037340 A1 Feb. 26, 2004

(51) Int. Cl.
*H01S 3/091* (2006.01)

(52) U.S. Cl. .......................................... 372/70; 372/69
(58) Field of Classification Search .................. 372/20, 372/25, 10, 18, 41, 68, 69, 70
See application file for complete search history.

(56) References Cited

U.S. PATENT DOCUMENTS

| | | | | |
|---|---|---|---|---|
| 4,975,918 A | * | 12/1990 | Morton | 372/20 |
| 5,272,713 A | * | 12/1993 | Sobey et al. | 372/69 |
| 5,940,418 A | * | 8/1999 | Shields | 372/22 |
| 6,016,324 A | * | 1/2000 | Rieger et al. | 372/25 |
| 6,178,040 B1 | * | 1/2001 | Injeyan et al. | 359/346 |
| 6,567,453 B1 | * | 5/2003 | Yamamoto et al. | 372/68 |

FOREIGN PATENT DOCUMENTS

| | | |
|---|---|---|
| EP | 0 967 699 A2 | 12/1999 |
| JP | 4-259269 A | 9/1992 |
| JP | 6-104508 A | 4/1994 |
| JP | 9-162467 A | 6/1997 |
| JP | 11-346018 A | 12/1999 |

OTHER PUBLICATIONS

Koechner, 5th edition, Germany: Springer-Verlag, (1999) ISBN 3-540-65064-4, pp. 425-428.
Koechner, 4th Extensively Revised and Updated Edition, Germany: Springer-Verlag, (1996) ISBN 3-540-53756-2, Springer Serives in Optical Sciences, pp. 434-445.

* cited by examiner

*Primary Examiner*—Minsun O. Harvey
*Assistant Examiner*—Dung (Michael) T. Nguyen
(74) *Attorney, Agent, or Firm*—Birch, Stewart, Kolasch & Birch, LLP

(57) ABSTRACT

A pumping module is provided with a first square rod group including a first square rod having two heat sinking surfaces normal to a direction of y axis perpendicular to an optical axis, and a second square rod having two heat sinking surfaces normal to a direction of x axis perpendicular to the optical axis and the direction of the y axis, and a second square rod group including a third square rod having two heat sinking surfaces normal to the direction of the y axis and a fourth square rod having two heat sinking surfaces normal to the direction of the x axis. A polarization rotator is disposed between the first and second square rod groups, for rotating a polarization of laser light passing therethrough by 90 degrees.

16 Claims, 7 Drawing Sheets

FIG.1 *(Prior Art)*
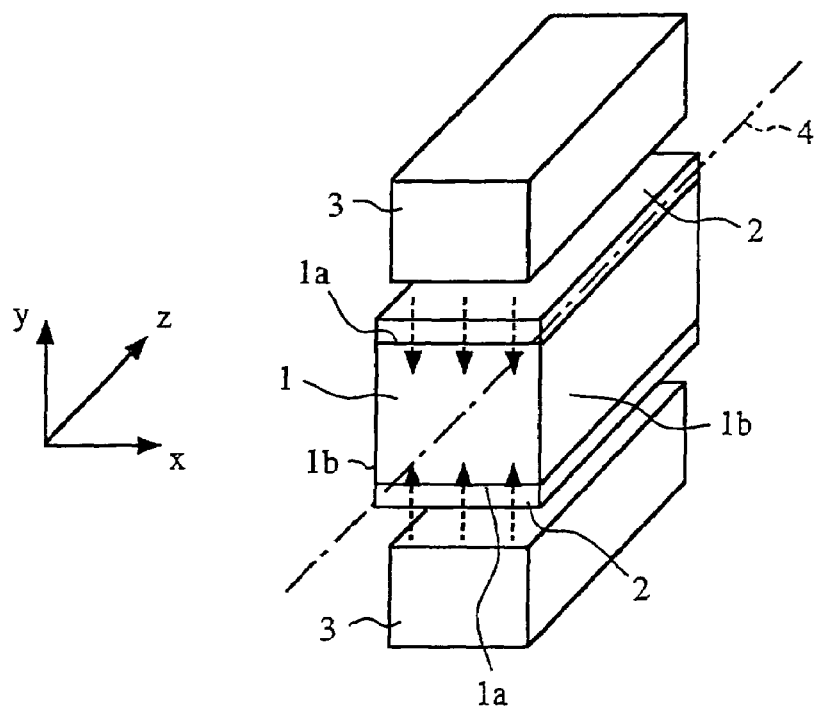
FIG.2 *(Prior Art)*
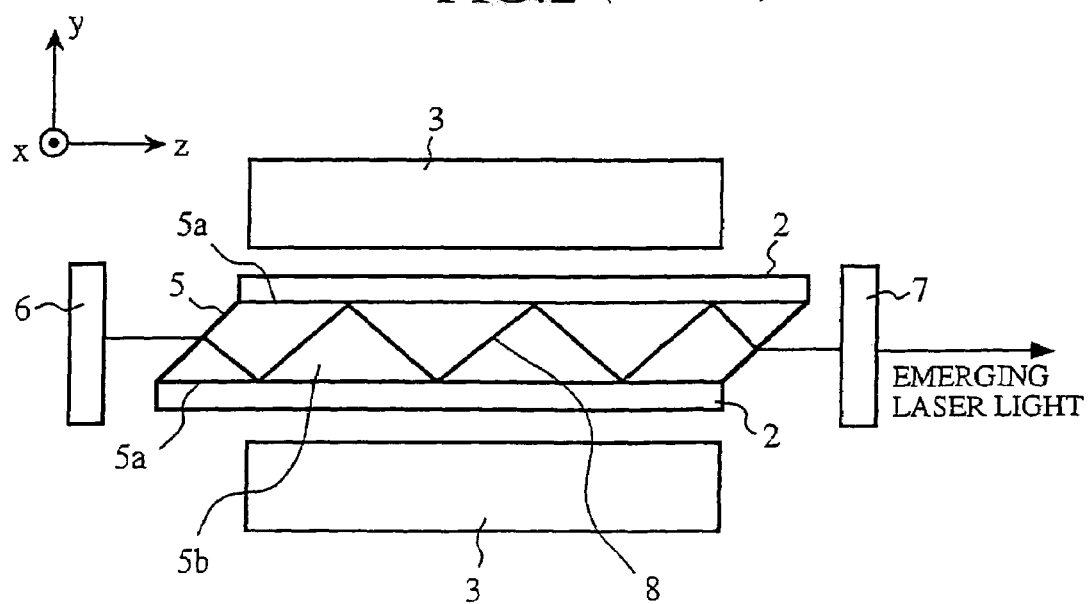
EMERGING LASER LIGHT

FIG.3 (Prior Art)
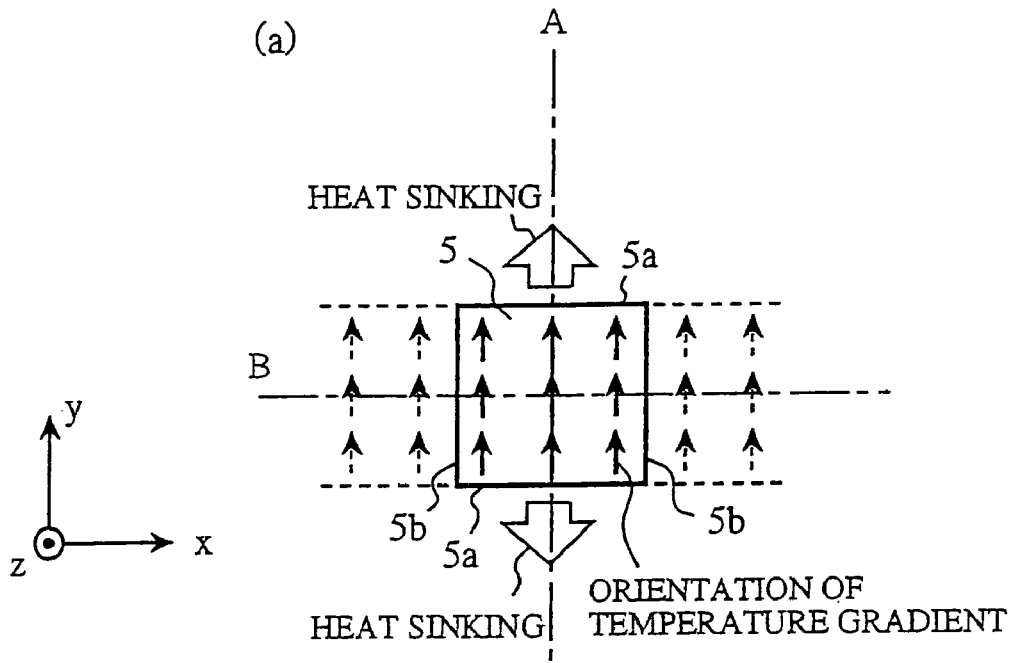
(a)
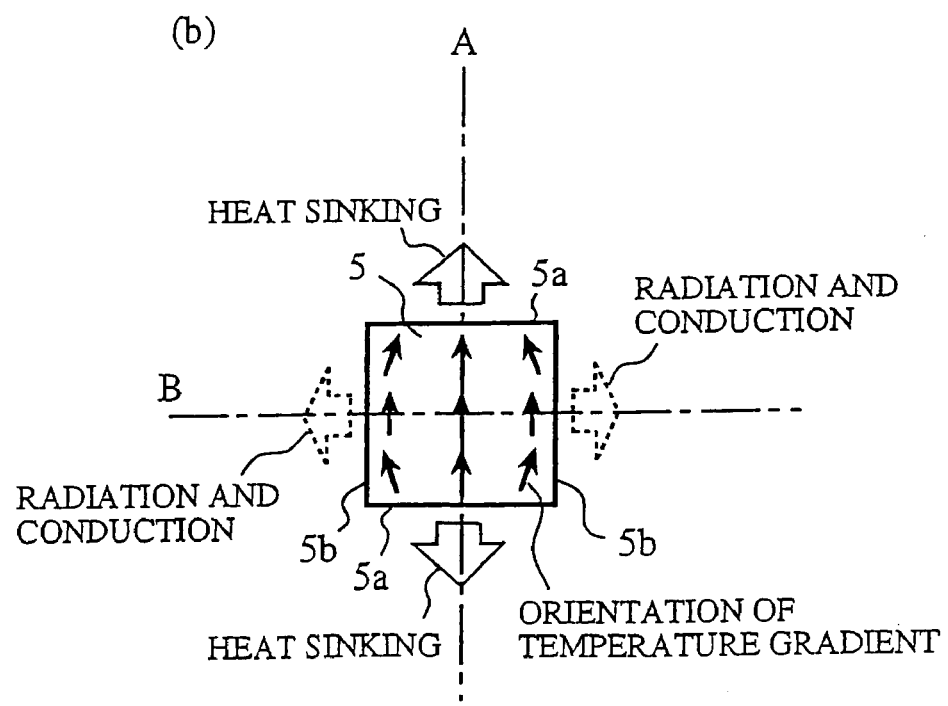
(b)

EXCITATION MODULE, LASER OSCILLATOR, AND LASER AMPLIFIER

This application is the national phase under 35 U.S.C. § 371 of PCT International Application No. PCT/JP01/05316 which has an International filing date of Jun. 21, 2001, which designated the United States of America.

FIELD OF THE INVENTION

The present invention relates to a pumping module that makes laser light pass through a square rod that absorbs pump light incident thereon so as to provide a gain for the laser light. It also relates to a laser oscillator that uses the pumping module and a laser amplifier that uses the pumping module.

BACKGROUND OF THE INVENTION

In a square rod (rectangular rod or slab) formed in the form of a square pillar, which is used as a laser medium for a solid state laser apparatus, it is easy to install a mechanism (metallic heat sink or the like) for dissipating heat generated in the square rod from a couple of lateral surfaces facing each other which serve as heat sinking surfaces and it is therefore easy to dissipate the heat from the square rod, because the heat sinking surfaces are planar.

Furthermore, a square rod has a feature of easily providing laser oscillation of linear polarization by causing birefringence to occur in the square rod in one direction because a temperature gradient is produced only in a direction of heat sinking if ideal heat sinking is carried out. Therefore, a pumping module that uses a square rod is suitable for spaceborne laser equipment which requires conduction cooling, laser equipment intended for laser machining which requires high average laser power, and so on.

FIG. 1 is a diagram showing the structure of a prior art pumping module which is so constructed as to use a square rod. For example, the pumping module of FIG. 1 is disclosed in pp. 434 of the following reference 1.

<Reference 1>
Springer Series in Optical Sciences Vol.1 "Solid-State Laser Engineering the Fourth Version", written by Walter Koechner and printed by Germany Springer Co. in 1996

In FIG. 1, reference numeral 1 denotes a square rod, reference numeral 1a denotes a heat sinking surface of the square rod 1, reference numeral 1b denotes another heat sinking surface which is perpendicular to the heat sinking surface 1a of the square rod 1, reference numeral 2 denotes cooling water, reference numeral 3 denotes a pump light source, and reference numeral 4 denotes an optical axis. In FIG. 1, y axis coincides with a direction of heat sinking, z axis coincides with the optical axis 4, and x axis coincides with a direction perpendicular to the y axis and the z axis.

Next, a description will be made as to the operation of the prior art pumping module.

In the pumping module that uses the square rod 1 of FIG. 1, pump light emitted out of the pump light source 3 is absorbed by the square rod 1, and this results in generation of a gain. The pump light thus amplifies laser light that propagates in the direction of the optical axis. Heat generated in the square rod 1 is dissipated via the heat sinking surface 1a in the direction of the y axis by the cooling water 2.

In the prior art pumping module, because a temperature gradient is produced only in the direction of heat sinking when generated heat is ideally dissipated from the heat sinking surface 1a, the two axes (fast axis and slow axis) of heat birefringence caused by the temperature gradient appear in the direction of the y axis and in the direction of the x axis, respectively. Therefore, when laser light linearly polarized in the direction of the y axis or x axis is incident upon the pumping module of FIG. 1, the laser light can propagate within the square rod 1 with the linear polarization being held, and therefore the loss in the cavity due to decrease in the extinction ratio can be reduced and the laser oscillation of linear polarization can be facilitated.

However, the pumping module of FIG. 1 has the following drawbacks.

In other words, because a thermal lens effect according to the temperature gradient is produced only in the direction of heat sinking (the direction of the y axis), and no thermal lens effect is produced in the direction (the direction of the x axis) perpendicular to the direction of heat sinking, the square rod 1 serves as a cylindrical lens that provides a lens effect only in the direction of the y axis, and that provides astigmatism for the laser light passing therethrough. Therefore, a problem encountered in the pumping module is that a mechanism of compensating for astigmatism is needed when the pumping module of FIG. 1 is used for such a laser apparatus as a laser oscillator or a laser amplifier, just as it is, and the optical system structure thus becomes complex.

The structure of a cavity that uses a pumping module having a modified square rod is disclosed, as a technique for solving this problem, in pp. 437 of the above-mentioned reference 1.

FIG. 2 is a diagram showing the structure of a laser oscillator to which the prior art pumping module is applied. The same reference numerals as shown in FIG. 1 denote the same components or like components.

In FIG. 2, reference numeral 5 denotes a square rod whose both ends are ground so that they have a Brewster Angle, reference numeral 5a denotes a heat sinking surface of the square rod 5, reference numeral 5a denotes a lateral surface perpendicular to the heat sinking surface 5a of the square rod 5, reference numeral 6 denotes a total reflection mirror, reference numeral 7 denotes a partial reflection mirror, and reference numeral 8 denotes an optical path along which laser light propagates within the laser oscillator.

Next, a description will be made as to the operation of the prior art laser oscillator.

In the laser oscillator of FIG. 2, because laser light propagates along a zig-zag optical path in the square rod 5, temperature gradients caused in the direction of heat sinking are made uniform and therefore the thermal lens effect can be compensated for. Furthermore, because no thermal lens effect is produced in the direction of the x axis when heat is ideally dissipated from the heat sinking surface 5a, the astigmatism can be compensated for.

However, because the square rod 5 actually used has a limited size in the case of using the pumping module shown in FIG. 2, heat is also dissipated from the lateral surface 5b through radiation and conduction even though heat is dissipated from the heat sinking surface 5a. Thus a problem encountered in the prior art laser oscillator is that it is difficult for heat to be ideally dissipated only in the direction of the y axis, and the direction of the temperature gradients is not parallel to the direction of the y axis and therefore there causes an inclination in the direction of the temperature gradients.

This problem will be explained a little more in detail.

FIGS. 3(a) and 3(b) are diagrams for explaining an inclination of the directions of the temperature gradients in the square rod 5 of the laser oscillator of FIG. 2, and each of them shows a cross section of the square rod 5 taken along a plane perpendicular to the z axis. FIG. 3(*a*) shows a case where heat is ideally dissipated from the heat sinking surface 5*a*, and FIG. 3(*b*) shows a case where there causes variations in the directions of the temperature gradients in the square rod 5 having a limited size. The same reference numerals as shown in FIG. 2 denote the same components and like components.

In the case of FIG. 3(*a*), because heat is ideally dissipated only from the heat sinking surface 5*a*, all the directions of the temperature gradients become parallel to the y axis and the birefringence axes appear in the direction of y axis and in the direction of x axis, respectively, wherever in the cross section of the square rod 5. Therefore, when laser light linearly polarized in the direction of the y axis or x axis is incident upon the square rod 5, the laser light propagates within the square rod 5 with the linear polarization thereof being held. Because the temperature gradients are produced only in the direction of the y axis, a thermal lens effect is produced only in the direction of the y axis and no thermal lens effect is produced in the direction of the x axis.

On the other hand, even in the case of FIG. 3(*b*), when focused to the center of the square rod 5 and line segments on A axis and B axis of the square rod 5, the directions of the temperature gradients are parallel to the y axis and the birefringence axes appear in the direction of the y axis and in the direction of the x axis, respectively.

However, ununiformity is caused in the directions of the temperature gradients produced in the cross section of the square rod 5 because the square rod 5 has a limited size and therefore heat is also dissipated from the lateral surface 5*b* through radiation and conduction. In other words, when focused to other than the center of the square rod 5 and line segments on the A axis and B axis of the square rod 5, the temperature gradients are inclined against the direction of the y axis.

Therefore, there cause variations in the orientation of the two birefringence axes in cross section of the square rod 5. When laser light linearly polarized in the direction of the y axis or the x axis passes through the square rod 5 of FIG. 3(*b*), a decrease occurs in the degree of linear polarization and hence a decrease occurs in the extinction ratio due to the ununiformity of the birefringence. Furthermore, when the pumping module of FIG. 2 is applied to such a laser apparatus as a laser oscillator or a laser amplifier, a decrease in the efficiency of energy and a decrease in the beam quality can occur.

Moreover, temperature gradients are produced in the direction of the x axis and a weak thermal lens effect is produced because the directions of the temperature gradients have an inclination with respect to the y axis. This means that astigmatism occurs due to the thermal lens effect produced in the direction of the x axis while the thermal lens effect in the direction of the y axis can be canceled in the prior art pumping module as shown in FIG. 2. Therefore, a problem with the prior art pumping module is that a mechanism of compensating for astigmatism is needed for such a laser apparatus to which the pumping module of FIG. 2 is applied as a laser oscillator or a laser amplifier, and the optical system structure thus becomes complex.

A problem with prior art pumping modules constructed as mentioned above is that the extinction ratio of laser light passing through the square rod is decreased because it is difficult to provide ideal heat sinking such that temperature gradients are produced only in the direction of the y axis and this results in occurrence of a variation in the orientation of the birefringence axes.

Another problem with prior art pumping modules is that astigmatism occurs because a thermal lens effect is also produced in the direction of the x axis.

Another problem encountered in such a laser apparatus to which a prior art pumping module is applied as a laser oscillator or a laser amplifier is that a decrease in the efficiency of energy and a decrease in the beam quality can occur, and a mechanism of compensating for astigmatism is needed and the optical system structure thus becomes complex.

The present invention is proposed to solve the above-mentioned problems, and it is therefore an object of the present invention to provide a pumping module capable of preventing any decrease in the extinction ratio which is caused by a variation in the orientation of the birefringence axes that occurs in a square rod, and reducing astigmatism.

It is another object of the present invention to provide a laser oscillator and a laser amplifier capable of preventing any decrease in the efficiency of energy and any decrease in the beam quality without having to use a mechanism for compensating for astigmatism.

DISCLOSURE OF THE INVENTION

A pumping module in accordance with an aspect of the present invention is provided with a first square rod group including a first square rod having an optical axis and having a couple of heat sinking surfaces normal to a first axis perpendicular to the optical axis and a second square rod having the optical axis in common with the first square rod and having a couple of heat sinking surfaces normal to a second axis perpendicular to the optical axis and the first axis; a second square rod group including a third square rod having the optical axis in common with the first square rod and having a couple of heat sinking surfaces normal to the first axis and a fourth square rod having the optical axis in common with the first square rod and having a couple of heat sinking surfaces normal to the second axis; and a 90-degree polarization rotator disposed between the first and second square rod groups and having the optical axis in common with the first through fourth square rods, for rotating a polarization of the laser light passing therethrough by 90 degrees.

As a result, the present invention offers an advantage of being able to prevent any decrease in the extinction ratio regardless of a variation in the orientation of the birefringence axes of each of the plurality of square rods, and to prevent the occurrence of a difference between a thermal lens with respect to the direction of the first axis and another thermal lens with respect to the direction of the second axis, thereby preventing the occurrence of astigmatism.

In the pumping module in accordance with another aspect of the present invention, the first square rod group is provided with the first square rod and the second square rod in each of which the laser light is allowed to propagate along a zig-zag optical path between the couple of heat sinking surfaces thereof, and the second square rod group is provided with the third square rod and the fourth square rod in each of which the laser light is allowed to propagate along a zig-zag optical path between the couple of heat sinking surfaces thereof.

As a result, the present invention offers another advantage of being able to make temperature gradients caused in a direction of heat sinking uniform in each of the plurality of square rods, thereby preventing thermal lens effects from being produced.

In accordance with another aspect of the present invention, a pumping module is provided with a plurality of pumping modules according to claim 1 and the plurality of pumping modules are arranged so that their optical axes coincide with one another and they are cascaded.

As a result, the present invention provides another advantage of being able to increase the number of square rods, thereby increasing the gain to be given to the laser light.

In the pumping module in accordance with a further aspect of the present invention, the first square rod group is provided with the first square rod and the second square rod which are integrally formed, and the second square rod group is provided with the third square rod and the fourth square rod which are integrally formed.

As a result, the present embodiment provides another advantage of being able to facilitate the alignment of each of the plurality of square rods and to omit processes such as grinding and coating of each of the plurality of square rods, thereby reducing the cost of the pumping module.

In accordance with another aspect of the present invention, a pumping module is provided with: a first polarization rotating optical system including seventh and eighth square rods having an optical axis and each having a couple of heat sinking surfaces normal to a first axis perpendicular to the optical axis, and a first 90-degree polarization rotator having the optical axis in common with the seventh and eighth square rods and disposed between the seventh and eighth square rods, for rotating a polarization of the laser light passing therethrough by 90 degrees; and a second polarization rotating optical system including ninth and tenth square rods having the optical axis in common with the seventh and eighth square rods and each having a couple of heat sinking surfaces normal to a second axis perpendicular to the optical axis and the first axis, and a second 90-degree polarization rotator having the optical axis in common with the seventh and eighth square rods and disposed between the ninth and tenth square rods, for rotating a polarization of the laser light passing therethrough by 90 degrees.

As a result, the present invention offers an advantage of being able to prevent any decrease in the extinction ratio regardless of a variation in the orientation of the birefringence axes of each of the plurality of square rods, and to prevent the occurrence of a difference between a thermal lens with respect to the direction of the first axis and another thermal lens with respect to the direction of the second axis, thereby preventing the occurrence of astigmatism.

In the pumping module in accordance with a further aspect of the present invention, the first polarization rotating optical system is provided with the seventh square rod and the eighth square rod in each of which the laser light is allowed to propagate along a zig-zag optical path between the couple of heat sinking surfaces thereof, and the second polarization rotating optical system is provided with the ninth square rod and the tenth square rod in each of which the laser light is allowed to propagate along a zig-zag optical path between the couple of heat sinking surfaces thereof.

As a result, the present invention offers another advantage of being able to make temperature gradients caused in a direction of heat sinking uniform in each of the plurality of square rods, thereby preventing thermal lens effects from being produced.

In accordance with another aspect of the present invention, a pumping module includes a plurality of pumping modules according to claim 5 and the plurality of pumping modules are arranged so that their optical axes coincide with one another and they are cascaded.

As a result, the present invention provides another advantage of being able to increase the number of square rods, thereby increasing the gain to be given to the laser light.

In accordance with a further aspect of the present invention, a pumping module is provided with: a reflection square rod group including one or more eleventh square rods having an optical axis and each having a couple of heat sinking surfaces normal to a first axis perpendicular to the optical axis and a same number of twelfth square rods as that of eleventh square rods, having the optical axis in common with the one or more eleventh square rods and each having a couple of heat sinking surfaces normal to a second axis perpendicular to the optical axis and the first axis; a first total reflection mirror for reflecting the laser light emitted out of the reflection square rod group towards the reflection square rod group; and a first 45-degree polarization rotator having the optical axis in common with the one or more eleventh square rods and disposed between the reflection square rod group and the first total reflection mirror, for rotating a polarization of the laser light passing therethrough by 45 degrees.

As a result, the present invention offers an advantage of being able to prevent any decrease in the extinction ratio regardless of a variation in the orientation of the birefringence axes of each of the plurality of square rods, and to prevent the occurrence of a difference between a thermal lens with respect to the direction of the first axis and another thermal lens with respect to the direction of the second axis, thereby preventing the occurrence of astigmatism.

In the pumping module in accordance with another aspect of the present invention, the reflection square rod group is provided with the one or more eleventh square rods and the one or more twelfth square rods in each of which the laser light is allowed to propagate along a zig-zag optical path between the couple of heat sinking surfaces thereof.

As a result, the present invention offers another advantage of being able to make temperature gradients caused in a direction of heat sinking uniform in each of the plurality of square rods, thereby preventing thermal lens effects from being produced.

In the pumping module in accordance with a further aspect of the present invention, equal numbers of the one or more eleventh square rods and the one or more twelfth square rods are integrally formed in the reflection square rod group.

As a result, the present embodiment offers an advantage of being able to facilitate the alignment of each of the plurality of square rods and to omit processes such as grinding and coating of each of the plurality of square rods, thereby reducing the cost of the pumping module.

In accordance with another aspect of the present invention, a laser oscillator is provided with a pumping module according to claim 1; a total reflection mirror that is perpendicular to an optical axis of the pumping module; and a partial reflection mirror that is disposed so that the pumping module is sandwiched between the partial reflection mirror and the total reflection mirror and that is perpendicular to the optical axis.

As a result, the present invention provides another advantage of being able to prevent any decrease in the efficiency of energy and any decrease in the beam quality without having to use a mechanism of compensating for astigmatism.

In accordance with a further aspect of the present invention, a laser oscillator is provided with: a pumping module according to claim 5; a total reflection mirror that is perpendicular to an optical axis of the pumping module; and a partial reflection mirror that is disposed so that the pumping module is sandwiched between the partial reflection mirror and the total reflection mirror and that is perpendicular to the optical axis.

As a result, the present invention provides another advantage of being able to prevent any decrease in the efficiency of energy and any decrease in the beam quality without having to use a mechanism of compensating for astigmatism.

In accordance with another aspect of the present invention, a laser oscillator is provided with: a pumping module according to claim 8; and a partial reflection mirror that pairs up with a first total reflection mirror of the pumping module and is disposed so that the reflection square rod group and the first polarization rotator are sandwiched between the first partial reflection mirror and the partial reflection mirror and that is perpendicular to the optical axis.

As a result, the present invention provides another advantage of being able to prevent any decrease in the efficiency of energy and any decrease in the beam quality without having to use a mechanism of compensating for astigmatism.

In accordance with a further aspect of the present invention, the laser oscillator includes a second 45-degree polarization rotator having the optical axis in common with the pumping module and disposed between the partial reflection mirror and the pumping module, for rotating a polarization of laser light passing therethrough by 45 degrees.

As a result, the present invention provides another advantage of being able to prevent any decrease in the efficiency of energy and any decrease in the beam quality without having to use a mechanism of compensating for astigmatism.

In accordance with another aspect of the present invention, the laser oscillator includes a polarizer disposed on the optical axis between the partial reflection mirror and the pumping module, for allowing laser light of a predetermined polarization to pass therethrough, and for reflecting laser light of a polarization perpendicular to the former laser light of predetermined polarization in a direction perpendicular to the optical axis, and a second total reflection mirror for reflecting the laser light reflected by the polarizer towards the polarizer.

As a result, the present invention provides another advantage of being able to prevent any decrease in the efficiency of energy and any decrease in the beam quality without having to use a mechanism of compensating for astigmatism.

In accordance with a further aspect of the present invention, a laser amplifier amplifies and outputs an input laser light by using a pumping module according to claim 1.

As a result, the present invention provides another advantage of being able to prevent any decrease in the efficiency of energy and any decrease in the beam quality without having to use a mechanism of compensating for astigmatism.

In accordance with another aspect of the present invention, a laser amplifier amplifies and outputs an input laser light by using a pumping module according to claim 5.

As a result, the present invention provides another advantage of being able to prevent any decrease in the efficiency of energy and any decrease in the beam quality without having to use a mechanism of compensating for astigmatism.

In accordance with a further aspect of the present invention, a laser amplifier includes: a pumping module according to claim 8; and a polarizer disposed on an optical axis of the pumping module, for allowing laser light of a predetermined polarization to pass therethrough, and for reflecting laser light of a polarization perpendicular to the former laser light of the predetermined polarization in a direction perpendicular to the optical axis, the laser light of the predetermined polarization being input to the pumping module by way of the polarizer.

As a result, the present invention provides another advantage of being able to prevent any decrease in the efficiency of energy and any decrease in the beam quality without having to use a mechanism of compensating for astigmatism.

BRIEF DESCRIPTION OF THE FIGURES

FIG. 1 is a diagram showing the structure of a prior art pumping module;

FIG. 2 is a diagram showing the structure of a laser oscillator to which the prior art pumping module is applied;

FIG. 3 is figure for explaining an inclination in the directions of temperature gradients in a square rod of the laser oscillator of FIG. 2;

PREFERRED EMBODIMENTS OF THE INVENTION

In order to explain the present invention in greater detail, the preferred embodiments will be described below with reference to the accompanying figures.

Embodiment 1.

Figure 4:
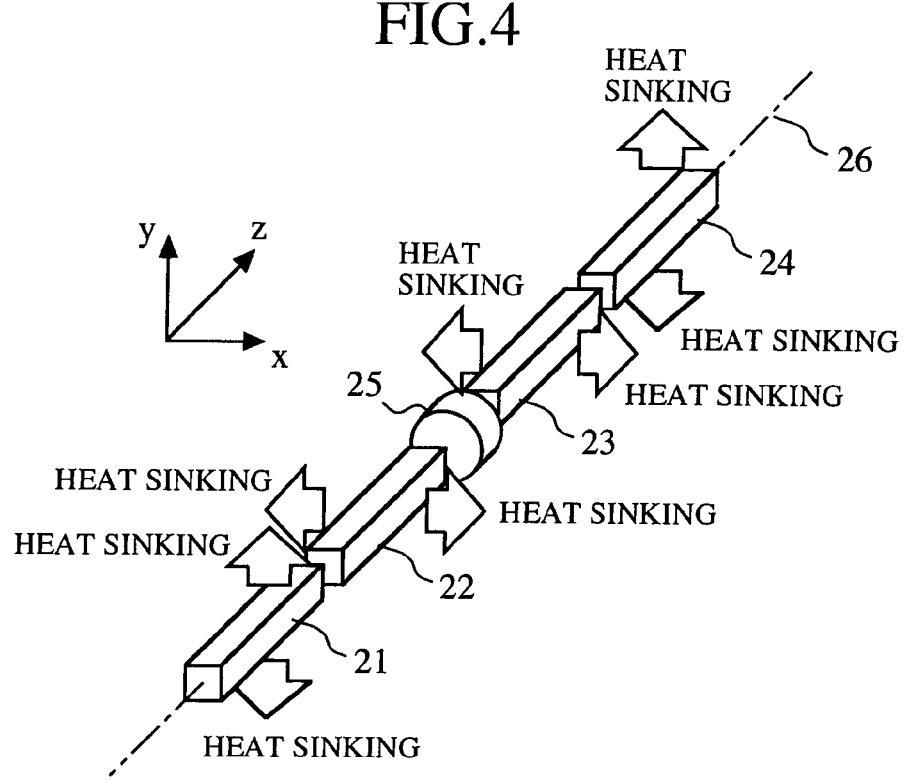
FIG. 4 is a diagram showing the structure of a pumping module according to embodiment 1 of the present invention.

FIG. 4 is a diagram showing the structure of a pumping module according to embodiment 1 of the present invention. The pumping module is constructed of a plurality of square rods.

In FIG. 4, reference numeral 21 denotes a first square rod (first square rod group), reference numeral 22 denotes a second square rod (first square rod group), reference numeral 23 denotes a third square rod (second square rod group), reference numeral 24 denotes a fourth square rod (second square rod group), reference numeral 25 denotes a 90-degree polarization rotator, and reference numeral 26 denotes an optical axis which the first through fourth square rods 21 to 24 and the 90-degree polarization rotator 25 have in common.

As shown in FIG. 4, the first square rod 21 has a couple of heat sinking surfaces which are normal to a direction of y axis (a direction of a first axis), and the fourth square rod 24 has a couple of heat sinking surfaces which are normal to the direction of the y axis, too. The second square rod 22 has a couple of heat sinking surfaces which are normal to a direction of x axis (a direction of a second axis), and the third square rod 23 has a couple of heat sinking surfaces which are normal to the direction of the x axis, too. The 90-degree polarization rotator 25 is placed between the second square rod 22 and the third square rod 23.

The first square rod 21 and the fourth square rod 24 are pumped in much the same way, and temperature gradients and birefringence are produced in much the same way in the first and fourth square rods 21 and 24. Similarly, the second square rod 22 and the third square rod 23 are pumped in much the same way, and temperature gradients and birefringence are produced in much the same way in the second and third square rods 22 and 23.

Next, a description will be made as to the operation of the pumping module of embodiment 1 of the present invention.

Laser light travels along the optical axis 26 and passes through the first and second square rods 21 and 22 in succession, and is then incident upon the 90-degree polarization rotator 25. The 90-degree polarization rotator 25 emits the incident laser light to the third square rod 23 after rotating the polarization of the incident laser light by 90 degrees. The laser light emitted out of the 90-degree polarization rotator 25 passes through the third and fourth square rods 23 and 24 in succession. Pump light emitted out of a pump light source not shown in the figure is absorbed by the first through fourth square rods 21 to 24 and a gain is produced in each of them, and the laser light traveling in the direction of the optical axis 26 is amplified by the first through fourth square rods 21 to 24.

Changes in the polarization of the laser light propagating through the pumping module will be explained by using a Jones matrix.

In general, assuming that laser light incident upon an arbitrary optical element has a polarized component $E_x$ in the direction of the x axis and a polarized component $E_y$ in the direction of the y axis and the optical element has a Jones matrix J, the polarized components $E_{xout}$ and $E_{yout}$ of the laser light emitted out of the optical element are given by the following equation (1).

$$\begin{pmatrix} E_{xout} \\ E_{yout} \end{pmatrix} = J \cdot \begin{pmatrix} E_x \\ E_y \end{pmatrix} \quad \text{Equation (1)}$$

The Jones matrix J of the optical element is a matrix having 2 rows and 2 columns. The equation (1) shows that the incident polarized light vector $(E_x, E_y)^T$ of the laser light (the superscript T is an operator indicating a transposition) is converted into the emerging polarized light vector $(E_{xout}, E_{yout})^T$ by the action J of the optical element.

The Jones matrix $J_B(\alpha, \delta)$ of a birefringence optical element is given by the following equation (2).

$$J_B(\alpha, \delta) = \begin{pmatrix} \cos\alpha & -\sin\alpha \\ \sin\alpha & \cos\alpha \end{pmatrix} \begin{pmatrix} \exp(i\frac{\delta}{2}) & 0 \\ 0 & \exp(-i\frac{\delta}{2}) \end{pmatrix} \begin{pmatrix} \cos\alpha & \sin\alpha \\ -\sin\alpha & \cos\alpha \end{pmatrix} \quad \text{Equation (2)}$$

$\alpha$ is an angle between the fast axis of the birefringence optical element and the x axis and $\delta$ is a phase difference between the fast axis and the slow axis of the birefringence optical element, where in the birefringence optical element, one of the two birefringence axes along which the phase of light is advanced is referred to as the fast axis (phase advance axis) and the other one of them along which the phase of light is delayed is referred to as the slow axis (phase delay axis).

In addition, because the Jones matrix of a polarization rotator is a rotation matrix having 2 rows and 2 columns, the Jones matrix $J_{Rot}$ of the 90-degree polarization rotator 25 is a 90-degree rotation matrix given by the following equation (3).

$$J_{Rot} = \begin{pmatrix} \cos\frac{\pi}{2} & -\sin\frac{\pi}{2} \\ \sin\frac{\pi}{2} & \cos\frac{\pi}{2} \end{pmatrix} = \begin{pmatrix} 0 & -1 \\ 1 & 0 \end{pmatrix} \quad \text{Equation (3)}$$

The Jones matrices $J_{R21}$ to $J_{R24}$ of the first through fourth square rods 21 to 24 will be extracted below based on the equation (2) hereafter.

Figure 5:
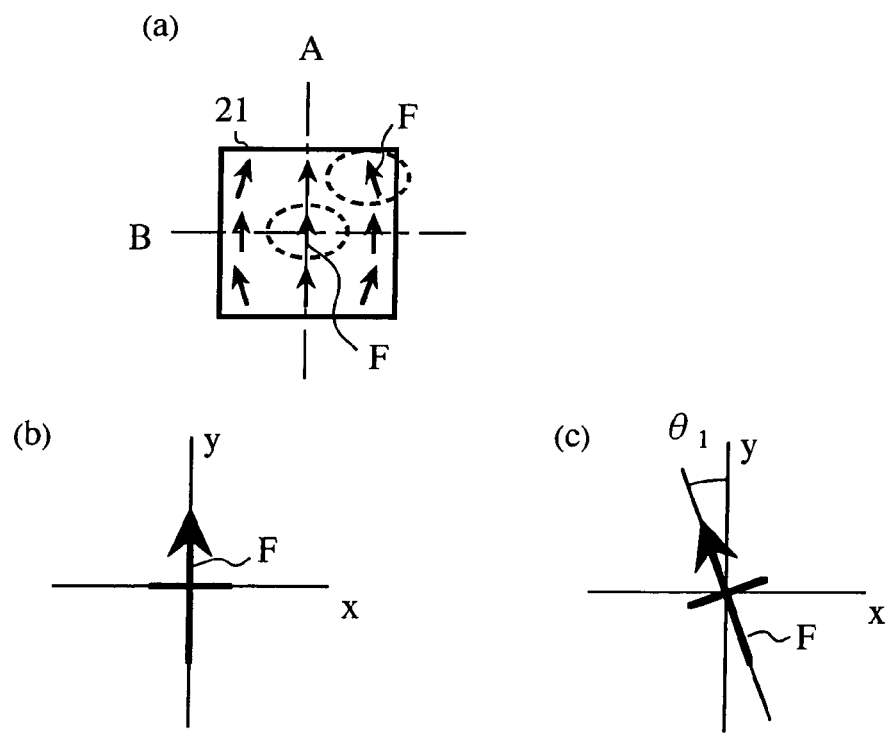
FIG. 5 is a diagram for explaining a Jones matrix of a first square rod.
Figure 6:
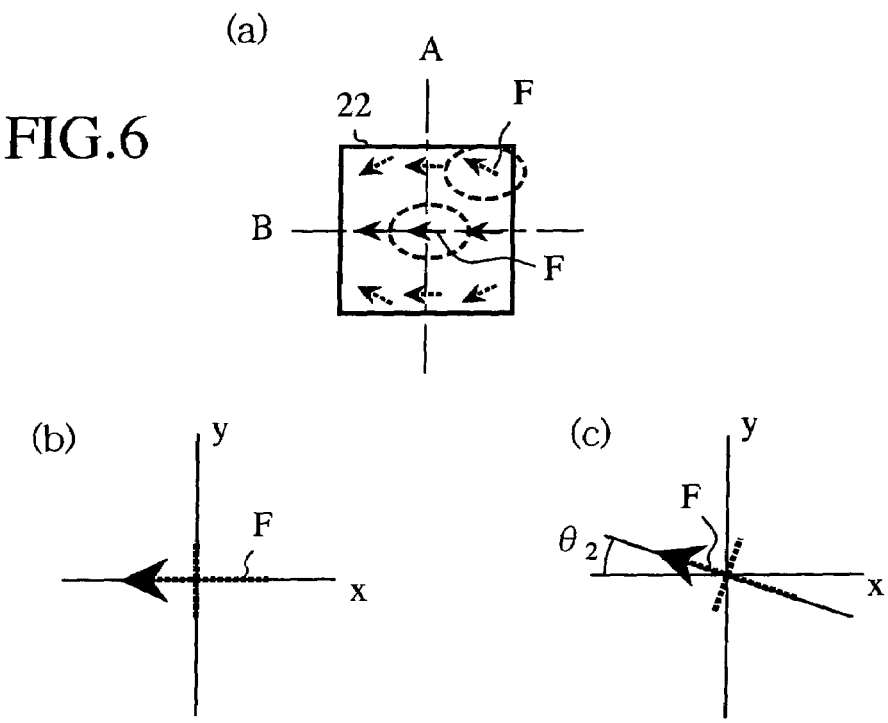
FIG. 6 is a diagram for explaining a Jones matrix of a second square rod.

FIGS. 5 and 6 are diagrams for explaining the Jones matrices $J_{R21}$ and $J_{R22}$ of the first and second square rods 21 and 22, respectively, and show cross-sectional views of the first and second square rods 21 and 22, which are taken along a plane normal to the optical axis 26. In FIGS. 5 and 6, the fast axis F of the birefringence produced in each of the first and second square rods 21 and 22 is shown by an arrow.

As explained in "Background of the Invention", because ideal heat sinking cannot be carried out in cross section of the first square rod 21 of FIG. 5(a) and therefore an inclination occurs in the directions of the temperature gradients, there causes a variation in the orientation of the fast axis F of the birefringence so that the fast axis F is not necessarily parallel to the y axis.

In other words, as shown in FIG. 5(b) that is an enlarged view of the central part of the first square rod 21, the fast axis F on the center of the first square rod 21, and the fast axes on A and B axes of the rod are parallel to the y axis. In contrast, as shown in FIG. 5(c), the fast axis F has an arbitrary angle $\theta_1$ (i.e., $\pi/2+\theta_1$ with respect to the direction of the x axis) with respect to the direction of the y axis at any location apart from the center of the first square rod 21, and the A and B axes of the rod.

Therefore, based on the equation (2) the Jones matrix $J_{R21}$ of the first square rod 21 is given by the following equation (4).

$$J_{R21} = J_B\left(\frac{\pi}{2} + \theta_1, \delta_1\right) \quad \text{Equation (4)}$$

The Jones matrix $J_{R22}$ of the second square rod 22 can be similarly considered.

All fast axes F are not parallel to the x axis in the second square rod 22, as shown in FIG. 6(a). In other words, while, as shown in FIG. 6(b), the fast axis F on the center of the second square rod 22, and the fast axes on the A and B axes of the rod are parallel to the x axis, as shown in FIG. 6(c), the fast axis F has an arbitrary angle $\theta_2$ (i.e., $\pi/2-\theta_2$ with respect to the direction of the y axis) with respect to the direction of the x axis at any location apart from the center of the second square rod 22, and the A and the B axes of the rod. Therefore, the Jones matrix $J_{R22}$ of the second square rod 22 can be given by the following equation (5).

$$J_{R22} = J_B(\pi-\theta_2, \delta_2) \qquad \text{Equation (5)}$$

The Jones matrix $J_{R24}$ of the fourth square rod 24 and the Jones matrix $J_{R23}$ of the third square rod 23 can be considered as follows.

In other words, in accordance with this embodiment 1, because the first square rod 21 and the fourth square rod 24 are pumped in much the same way, and the second square rod 22 and the third square rod 23 are pumped in much the same way, the temperature gradients and the birefringence axes similarly appear in each of the first and fourth square rods and the temperature gradients and the birefringence axes similarly appear in each of the second and third square rods. Therefore, the Jones matrix $J_{R24}$ of the fourth square rod 24 and the Jones matrix $J_{R23}$ of the third square rod 23 can be given by the equations (4) and (5), respectively ($J_{R24} = J_{R21}$, $J_{R23} = J_{R22}$).

The Jones matrix $J_{All}$ of the entire pumping module of FIG. 4 is calculated according to the following equation (6) based on the Jones matrices shown in the above-mentioned equations (2) to (5).

$$J_{All} = J_{R24} \cdot J_{R23} \cdot J_{Rot} \cdot J_{R22} \cdot J_{R21} \qquad \text{Equation (6)}$$

$$= J_B\left(\frac{\pi}{2}+\theta_1, \delta_1\right) \cdot J_B(\pi-\theta_2, \delta_2) \cdot \begin{pmatrix} 0 & -1 \\ 1 & 0 \end{pmatrix} \cdot J_B(\pi-\theta_2, \delta_2) \cdot J_B\left(\frac{\pi}{2}+\theta_1, \delta_1\right)$$

$$= \begin{pmatrix} 0 & -1 \\ 1 & 0 \end{pmatrix}$$

The equation (6) shows that the pumping module of this embodiment 1 operates in such a manner that despite the bearing angle $\theta_1$ of the first and fourth square rods 21 and 24, the bearing angle $\theta_2$ of the second and third square rods 22 and 23, the phase differences $\delta_1$ and $\delta_2$, the emerging polarized light vector $(E_{xout}, E_{yout})^T$ must be perpendicular to the incident polarized light vector $(E_x, E_y)^T$.

In other words, when the Jones matrix $J_{All}$ of the equation (6) is made to act on the incident polarized light vector $(E_x, E_y)^T$ of the equation (1), the emerging polarized light vector is $(E_{xout}, E_{yout})^T = (-E_y, E_x)^T$. The calculation of the inner product (dot product) of the incident polarized light vector and the emerging polarized light vector yields $(E_x, E_y)^T \cdot (-E_y, E_x)^T = E_x(-E_y) + E_y E_x = 0$. It is therefore understood that the incident polarized light vector $(E_x, E_y)^T$ is always perpendicular to the emerging polarized light vector $(E_{xout}, E_{yout})$ despite the birefringence of each of the first through fourth square rods 22 to 24.

Thus, the pumping module as shown in FIG. 4 functions as a 90-degree polarization rotator so as to rotate an arbitrary polarization of incident laser light by 90 degrees and emit the laser light. Therefore, the pumping module can prevent any decrease in the extinction ratio regardless of a variation in the orientation of the birefringence axes of each of the plurality of square rods. Application of the pumping module of FIG. 4 to a laser apparatus, such as a laser oscillator or a laser amplifier, can prevent any decrease in the energy efficiency of the laser apparatus and any decrease in the beam quality.

Next, compensation of thermal lens effects will be explained.

Laser light incident upon the pumping module of FIG. 4 passes through two thermal lenses (the second and third square rods 22 and 23) in which heat sinking is carried out in the direction of the x axis and two other thermal lenses (the first and fourth square rods 21 and 24) in which heat sinking is carried out in the direction perpendicular to the direction of the x axis. In other words, the laser light passes through the two other thermal lenses (the first and fourth square rods 21 and 24) in which heat sinking is carried out in the direction of the y axis and the two thermal lenses (the second and third square rods 22 and 23) in which heat sinking is carried out in the direction perpendicular to the direction of the y axis.

Therefore, in the pumping module of FIG. 4 there is no difference between the thermal lenses in the direction of the x axis and the thermal lenses in the direction of the y axis, and astigmatism can be prevented from occurring. Application of the pumping module of FIG. 4 to such a laser apparatus as a laser oscillator or a laser amplifier, any mechanism for compensating for astigmatism becomes unnecessary and therefore the optical system can be simplified.

In the above explanation, it is assumed that the laser light passing through the first through fourth square rods 21 to 24 propagates in parallel with the optical axis 26. This embodiment 1 is not limited to this configuration and each of the first through fourth square rods 21 to 24 can have both ends each of which is so formed and ground as to have a Brewster angle, like the square rod 5 of FIG. 2, so that the laser light propagates along a zig-zag optical path which is bent several times in the direction of the y axis in the first square rod 21, along a zig-zag optical path which is bent several times in the direction of the x axis in the second square rod 22, along a zig-zag optical path which is bent several times in the direction of the x axis in the third square rod 23, and along a zig-zag optical path which is bent several times in the direction of the y axis in the fourth square rod 24.

This configuration does not cause any thermal lens effect with respect to the direction of heat sinking in each of the plurality of square rods in each of which the incident laser light propagates along a zig-zag optical path because the temperature gradients caused in the direction of heat sinking are made uniform. Therefore, because as for the direction of the x axis the incident laser light passes through a thermal lens having a thermal lens effect with respect to a direction perpendicular to the direction of heat sinking twice, and, as for the direction of the y axis, also passes through a thermal lens having a thermal lens effect with respect to a direction perpendicular to the direction of heat sinking twice, there causes no difference between the thermal lens with respect to the direction of the x axis and the other thermal lens with respect to the direction of the y axis and the astigmatism can be compensated for.

In addition, the thermal lens of the entire pumping module becomes small because it doesn't receive the influence of the thermal lens effect with respect to the direction of heat sinking, and the design and structure of such a laser apparatus to which the pumping module is applied to, as a laser oscillator or a laser amplifier, are facilitated.

In the case of FIG. 4, the first square rod 21, the second square rod 22, the 90-degree polarization rotator 25, the third square rod 23, and the fourth square rod 24 are arranged in this order. However, this embodiment 1 is not limited to this configuration. As an alternative, the pumping module can have either of the following configurations (A) to (C), and the same advantages are provided in either case.

(A) The second square rod 22, the first square rod 21, the 90-degree polarization rotator 25, the third square rod 23, and the fourth square rod 24 are arranged in this order.

(B) The first square rod 21, the second square rod 22, the 90-degree polarization rotator 25, the fourth square rod 24, and the third square rod 23 are arranged in this order.

(C) The second square rod 22, the first square rod 21, the 90-degree polarization rotator 25, the fourth square rod 24, and third square rod 23 are arranged in this order.

In other words, when defining the 90-degree polarization rotator 25 as a boundary, the plurality of square rods can be classified into the first square rod group that consists of the first and second square rods 21 and 22 and the second square rod group that consists of the third and fourth square rods 23 and 24, and the order of the first and second square rods 21 and 22 in the first square rod group and the order of the third and fourth square rods 23 and 24 in the second square rod group can be arbitrarily determined.

The pumping module is provided with one set of the first square rod 21, the second square rod 22, the 90-degree polarization rotator 25, the third square rod 23, and the fourth square rod 24. As an alternative, the pumping module can have m sets of those components (m is a natural number) that are so constructed that their optical axes coincide with one another (i.e., they shares the optical axis 26) and are cascaded.

Even in this case, the pumping module can prevent any decrease in the extinction ratio regardless of a variation in the orientation of the birefringence axes of each of the plurality of square rods and can also prevent any decrease in the energy efficiency of a laser apparatus to which the pumping module is applied and any decrease in the beam quality. In addition, because the incident laser light passes through a thermal lens with respect to the direction of the x axis, having a thermal lens effect with respect to a direction perpendicular to the direction of heat sinking 2 m times, and also passes through a thermal lens with respect to the direction of the y axis, having another thermal lens effect with respect to a direction perpendicular to the direction of heat sinking 2 m times, there causes no difference between the thermal lens with respect to the direction of the x axis and the other thermal lens with respect to the direction of the y axis and the astigmatism can be compensated for.

Furthermore, because the cascade connection increases the number of square rods, the total gain to be given to the laser light is increased and the efficiency of such a laser apparatus to which the pumping module is applied, as a laser oscillator or a laser amplifier, is improved.

As mentioned above, in accordance with this embodiment 1, the pumping module is provided with a first square rod group including a first square rod 21 having an optical axis 26 and having a couple of heat sinking surfaces normal to a direction of y axis perpendicular to the optical axis 26 and a second square rod 22 having the optical axis 26 in common with the first square rod and having a couple of heat sinking surfaces normal to a direction of x axis perpendicular to the optical axis 26 and the direction of the y axis, a second square rod group including a third square rod 23 having the optical axis 26 in common with the first square rod and having a couple of heat sinking surfaces normal to the direction of the y axis and a fourth square rod 24 having the optical axis 26 in common with the first square rod and having a couple of heat sinking surfaces normal to the direction of the x axis, and a 90-degree polarization rotator 25 disposed between the first and second square rod groups and having the optical axis 26 in common with the first square rod, for rotating a polarization of laser light passing therethrough by 90 degrees. As a result, the present invention offers an advantage of being able to prevent any decrease in the extinction ratio regardless of a variation in the orientation of the birefringence axes of each of the plurality of square rods, and to prevent the occurrence of a difference between a thermal lens with respect to the direction of the x axis and another thermal lens with respect to the direction of the y axis, thereby preventing the occurrence of astigmatism.

Furthermore, in accordance with this embodiment 1, the first square rod group is provided with the first square rod 21 and the second square rod 22 in each of which the laser light propagates along a zig-zag optical path between the couple of heat sinking surfaces thereof, and the second square rod group is provided with the third square rod 23 and the fourth square rod 24 in each of which the laser light propagates along a zig-zag optical path between the couple of heat sinking surfaces thereof. As a result, the present embodiment offers another advantage of being able to make the temperature gradients caused in the direction of heat sinking uniform in each of the plurality of square rods, thereby preventing thermal lens effects from being produced.

In addition, in accordance with this embodiment 1, a plurality of pumping modules can be provided so that they have an optical axis in common with one another and are cascaded. As a result, the increased number of square rods can increase the gain to be given to the laser light.

Furthermore, in accordance with this embodiment 1, there is provided a laser oscillator including a pumping module according to embodiment 1, a total reflection mirror that is perpendicular to an optical axis 26 of the pumping module, and a partial reflection mirror that is disposed so that the pumping module is sandwiched between the partial reflection mirror and the total reflection mirror and that is perpendicular to the optical axis 26. As a result, the present embodiment offers another advantage of being able to prevent any decrease in the efficiency of energy and any decrease in the beam quality without having to use a mechanism of compensating for astigmatism.

In addition, in accordance with this embodiment 1, the pumping module can amplify and output an input laser light. As a result, the present embodiment offers another advantage of being able to provide a laser amplifier that can prevent any decrease in the efficiency of energy and any decrease in the beam quality without having to use a mechanism of compensating for astigmatism.

Embodiment 2.

Figure 7:
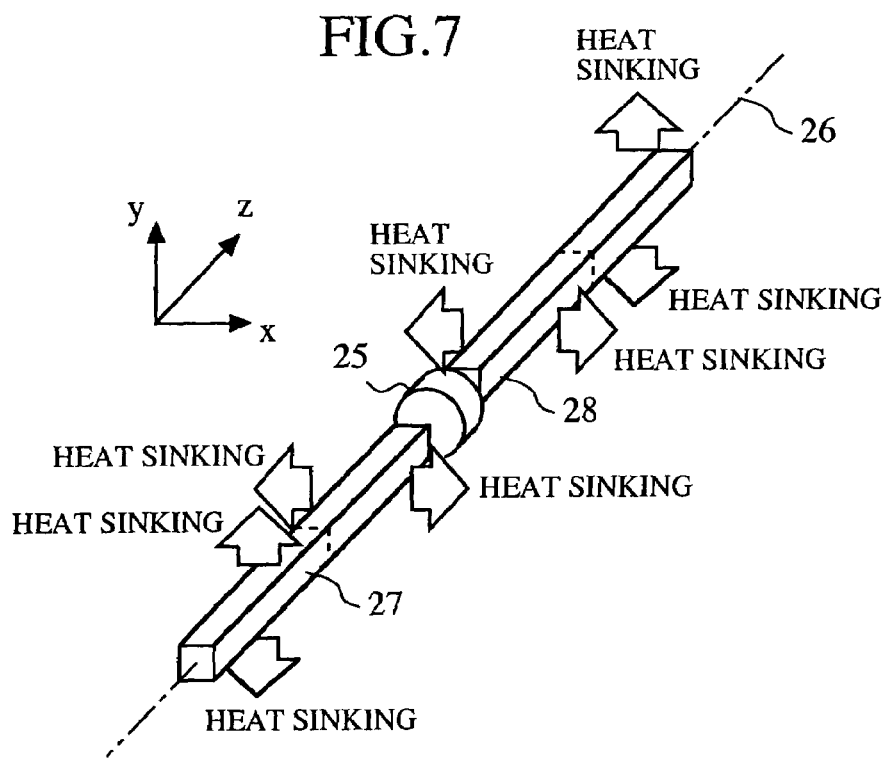
FIG. 7 is a diagram showing the structure of a pumping module according to embodiment 2 of the present invention.

FIG. 7 is a diagram showing the structure of a pumping module according to embodiment 2 of the present invention.

In FIG. 7, reference numeral 27 denotes a fifth square rod, reference numeral 28 denotes a sixth square rod, and reference numerals 25 and 26, which are also shown in FIG. 1, denote a 90-degree polarization rotator and an optical axis, respectively. The fifth and sixth square rods 27 and 28 and the 90-degree polarization rotator 25 have the optical axis 26 in common.

In the fifth square rod 27, heat generated in a half of thereof is dissipated in a direction of y axis and heat generated in the remaining half thereof is dissipated in a direction of x axis, and in the sixth square rod 28, heat generated in a half of thereof is dissipated in the direction of the x axis and heat generated in the remaining half thereof is dissipated in the direction of the y axis.

In other words, it can be considered that the fifth square rod 27 is equivalent to the one in which the first and second square rods 21 and 22 in the first square rod group in accordance with embodiment 1 are integrally formed. Similarly, the sixth square rod 28 is equivalent to the one in which the third and fourth square rods 23 and 24 in the second square rod group in accordance with embodiment 1 are integrally formed.

The 90-degree polarization rotator 25 is placed between the fifth and sixth square rods 27 and 28. The fifth square rod 27 and the sixth square rod 28 are pumped in much the same way, and temperature gradients and birefringence are caused in much the same way in the fifth and sixth square rods 27 and 28.

In the case of the pumping module as shown in FIG. 7 which is constructed as mentioned above, the Jones matrix is also given by the equation (6). Therefore, the pumping module of FIG. 7 can also offer an advantage of being able to prevent any decrease in the extinction ratio regardless of a variation in the orientation of the birefringence axes of each of the plurality of square rods. Application of the pumping module to a laser apparatus, such as a laser oscillator or a laser amplifier, makes it possible to prevent any decrease in the efficiency of energy and any decrease in the beam quality.

Furthermore, the pumping module of this embodiment provides similar thermal lens effects, and can prevent the occurrence of a difference between a thermal lens with respect to the direction of the x axis and another thermal lens with respect to the direction of the y axis, thereby preventing the occurrence of astigmatism. Therefore, a laser apparatus to which the pumping module is applied such as a laser oscillator or a laser amplifier need not use a mechanism of compensating for astigmatism and the optical system can be simplified.

Particularly, as compared with embodiment 1, because the number of square rods in the pumping module of this embodiment 2 is reduced, the alignment of each of the plurality of square rods is facilitated and processes such as grinding and coating of each of the plurality of square rods can be omitted, and therefore the cost of the pumping module can be reduced.

As mentioned above, in accordance with this embodiment 2, the first square rod group is provided with a fifth square rod 27 in which a first square rod 21 and a second square rod 22 are integrally formed, and the second square rod group is provided with a sixth square rod 28 in which a third square rod 23 and a fourth square rod 24 are integrally formed. As a result, the present embodiment offers an advantage of being able to facilitate the alignment of each of the plurality of square rods and to omit processes such as grinding and coating of each of the plurality of square rods, thereby reducing the cost of the pumping module.

Embodiment 3

Figure 8:
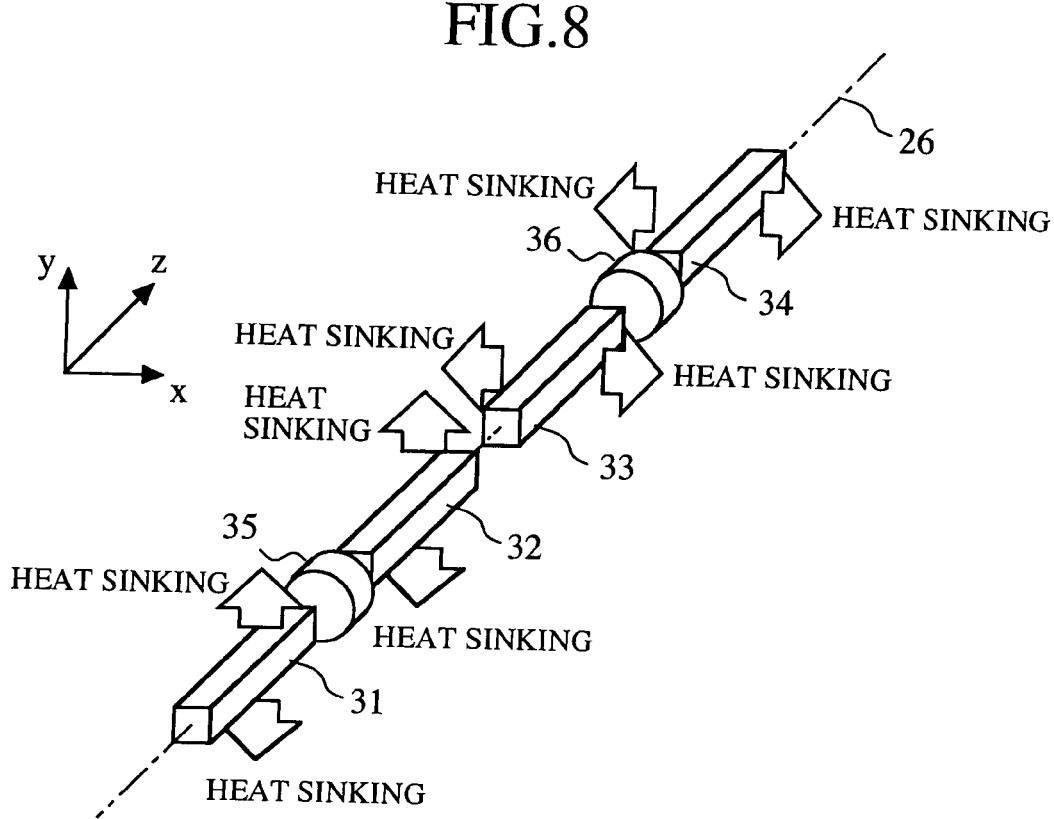
FIG. 8 is a diagram showing the structure of a pumping module according to embodiment 3 of the present invention.

FIG. 8 is a diagram showing the structure of a pumping module according to embodiment 3 of the present invention.

In FIG. 8, reference numeral 31 denotes a seventh square rod, reference numeral 32 denotes an eighth square rod, reference numeral 33 denotes a ninth square rod, reference numeral 34 denotes a tenth square rod, reference numeral 35 denotes a first 90-degree polarization rotator, and reference numeral 36 denotes a second 90-degree polarization rotator. Reference numeral 26, which is also shown in FIG. 1, denotes an optical axis. The seventh through tenth square rods 31 to 34 and the first and second 90-degree polarization rotators 35 and 36 have the optical axis 26 in common.

Both a couple of heat sinking surfaces of the seventh square rod 31 and a couple of heat sinking surfaces of the eighth square rod 32 are normal to a direction of y axis and both a couple of heat sinking surface of the ninth square rod 33 and a couple of heat sinking surface of the tenth square rod 34 are normal to a direction of x axis. The first 90-degree polarization rotator 35 is placed between the seventh square rod 31 and the eighth square rod 32, and the second 90-degree polarization rotator 36 is placed between the ninth square rod 33 and the tenth square rod 34.

The seventh square rod 31 and the eighth square rod 32 are pumped in much the same way, and temperature gradients and birefringence are caused in much the same way in the seventh and eighth square rods 31 and 32. Furthermore, the ninth square rod 33 and the tenth square rod 34 are pumped in much the same way, and temperature gradients and birefringence are caused in much the same way in the ninth and tenth square rods 33 and 34. The second 90-degree polarization rotator 36 rotates the polarization of laser light incident thereupon by 90 degrees (i.e., −90 degrees) opposite in direction to the polarization rotation done by the first 90-degree polarization rotator 35.

Next, a description will be made as to the operation of the pumping module according to embodiment 3 of the present invention.

Laser light travels on the optical axis 26, passes through the seventh square rod 31, and is then incident upon to the first 90-degree polarization rotator 35. The first 90-degree polarization rotator 35 emits the incident laser light towards the eighth square rod 32 after rotating the polarization of the incident laser light by 90 degrees. The laser light emitted out of the first 90-degree polarization rotator 35 further passes through the eighth square rod 32.

The laser light emitted out of the eighth square rod 33 travels on the optical axis 26, passes through the ninth square rod 33, and is then incident upon the second 90-degree polarization rotator 36. The second 90-degree polarization rotator 36 emits the incident laser light towards the tenth square rod 34 after rotating the polarization of the incident laser light by −90 degrees. The laser light emitted out of the second 90-degree polarization rotator 36 further passes through the tenth square rod 34.

Pump light emitted out of a pump light source not shown in the figure is absorbed by the seventh through tenth square rods 31 to 34 and a gain is produced, and the laser light traveling in the direction of the optical axis 26 is amplified by the seventh through tenth square rods 31 to 34.

The Jones matrix $J_{R31\text{-}R32}$ of the optical system that consists of the seventh square rod 31, the first 90-degree polarization rotator 35, and the eighth square rod 32 is given by the following equation (7).

$$J_{R31-R32} = J_{R32} \cdot J_{Rot} \cdot J_{R31} \quad \text{Equation (7)}$$

$$= J_B\left(\frac{\pi}{2} + \theta_1, \delta_1\right) \cdot \begin{pmatrix} 0 & -1 \\ 1 & 0 \end{pmatrix} \cdot J_B\left(\frac{\pi}{2} + \theta_1, \delta_1\right)$$

$$= \begin{pmatrix} 0 & -1 \\ 1 & 0 \end{pmatrix}$$

As can be seen from the equation (7), the first polarization rotating optical system that consists of the seventh square rod 31, the first 90-degree polarization rotator 35, and the eighth square rod 32 functions as a 90-degree polarization rotator despite the bearing angle $\theta_1$ and the phase difference $\delta_1$, and rotates the polarization of laser light incident thereupon by 90 degrees.

Similarly, the Jones matrix $J_{R33\text{-}R34}$ of the optical system that consists of the ninth square rod 33, the second 90-degree polarization rotator 36, and the tenth square rod 34 is given by the following equation (8).

$$J_{R33-R34} = J_{R34} \cdot J_{Rot} \cdot J_{R33} \quad \text{Equation (8)}$$

$$= J_B(\pi - \theta_2, \delta_2) \cdot \begin{pmatrix} 0 & 1 \\ -1 & 0 \end{pmatrix} \cdot J_B(\pi - \theta_2, \delta_2)$$

$$= \begin{pmatrix} 0 & 1 \\ -1 & 0 \end{pmatrix}$$

In other words, the equation (8) shows that the second polarization rotating optical system that consists of the ninth square rod 33, the second 90-degree polarization rotator 36, and the tenth square rod 34 functions as a 90-degree polarization rotator despite the bearing angle $\theta_2$ and the phase difference $\delta_2$, and rotates the polarization of laser light incident thereupon by −90 degrees.

Therefore, the Jones matrix $J_{All}$ of the pumping module as shown in FIG. 8 is given by the following equation (9).

$$J_{All} = J_{R34} \cdot J_{Rot} \cdot J_{R33} \cdot J_{R32} \cdot J_{Rot} \cdot J_{R31} \quad \text{Equation (9)}$$

$$= \begin{pmatrix} 0 & -1 \\ 1 & 0 \end{pmatrix} \cdot \begin{pmatrix} 0 & 1 \\ -1 & 0 \end{pmatrix}$$

$$= \begin{pmatrix} 1 & 0 \\ 0 & 1 \end{pmatrix}$$

Because the matrix of the equation (9) doesn't depend on the bearing angles $\theta_1$ and $\theta_2$ and the phase differences $\delta_1$ and $\delta_2$, and is a unit matrix having 2 rows and 2 columns, it can be understood that the pumping module doesn't change the polarization of the incident laser light. Therefore, because the pumping module doesn't change the polarization of the incident laser light regardless of a variation in the orientation of the birefringence axes of each of the plurality of square rods, no decrease occurs in the extinction ratio and any decrease in the efficiency of energy and any decrease in the beam quality can be prevented.

In this embodiment, the second 90-degree polarization rotator 36 rotates the polarization of laser light incident thereupon by 90 degrees (i.e., −90 degrees) opposite in direction to the rotation (+90 degrees) done by the first 90-degree polarization rotator 35. This embodiment 3 is not limited to this case. As an alternative, the second 90-degree polarization rotator 36 can rotate the polarization of laser light incident thereupon by 90 degrees in the same direction as the first 90-degree polarization rotator 35.

In this case, the pumping module as shown in FIG. 8 functions as a 180-degree polarization rotator (having a unit matrix whose coefficient is −1), and because the pumping module doesn't change the polarization of the incident laser light regardless of a variation in the orientation of the birefringence axes of each of the plurality of square rods, no decrease occurs in the extinction ratio and any decrease in the efficiency of energy and any decrease in the beam quality can be prevented.

Because, as for the direction of the x axis, the incident laser light passes through a thermal lens having a thermal lens effect with respect to the direction of heat sinking twice and passes through a thermal lens having a thermal lens effect with respect to a direction perpendicular to the direction of heat sinking twice, and, as for the direction of the y axis, the incident laser light also passes through a thermal lens having a thermal lens effect with respect to the direction of heat sinking twice and passes through a thermal lens having a thermal lens effect with respect to a direction perpendicular to the direction of heat sinking twice, there causes no difference between the thermal lenses with respect to the direction of the x axis and the other thermal lenses with respect to the direction of the y axis and the astigmatism can be therefore compensated for. Therefore, a laser apparatus to which the pumping module is applied such as a laser oscillator or a laser amplifier need not use a mechanism of compensating for astigmatism and the optical system can be simplified.

In the above explanation, it is assumed that the laser light passing through the seventh through tenth square rods 31 to 34 propagates in parallel with the optical axis 26. This embodiment 3 is not limited to this configuration and each of the seventh through tenth square rods 31 to 34 can be formed, as previously mentioned in Embodiment 1, so that the laser light propagates along a zigzag optical path which is bent several times in the direction of the y axis in the seventh square rod 31, along a zigzag optical path which is bent several times in the direction of the y axis in the eighth square rod 32, along a zigzag optical path which is bent several times in the direction of the x axis in the ninth square rod 33, and along a zigzag optical path which is bent several times in the direction of the x axis in the tenth square rod 34.

This configuration does not cause any thermal lens effect with respect to the direction of heat sinking in each of the plurality of square rods in each of which the incident laser light propagates along a zigzag optical path because the temperature gradients caused in the direction of heat sinking are made uniform. Therefore, because, as for the direction of the x axis, the incident laser light passes through a thermal lens having a thermal lens effect with respect to a direction perpendicular to the direction of heat sinking twice, and, as for the direction of the y axis, also passes through a thermal lens having a thermal lens effect with respect to a direction perpendicular to the direction of heat sinking twice, there causes no difference between the thermal lens with respect to the direction of the x axis and the other thermal lens with respect to the direction of the y axis and the astigmatism can be compensated for.

In addition, the thermal lens of the entire pumping module becomes small because it doesn't receive the influence of the thermal lens effect with respect to the direction of heat sinking, and the design and structure of such a laser apparatus to which the pumping module is applied to, as a laser oscillator or a laser amplifier, are facilitated.

The pumping module is provided with one first polarization rotating optical system including the seventh square rod 31, the first 90-degree polarization rotator 35 and the eighth square rod 32, and one second polarization rotating optical system including the ninth square rod 33, the second 90-degree polarization rotator 36 and the tenth square rod 34. As an alternative, the pumping module can have m first polarization rotating optical systems and m second polarization rotating optical systems (m is a natural number) that are so constructed that they are cascaded.

Because this configuration makes it possible not to change the polarization of incident laser light regardless of a variation in the orientation of the birefringence axes of each of the plurality of square rods, the pumping module can prevent any decrease in the extinction ratio and can also prevent any decrease in the energy efficiency of a laser apparatus to which the pumping module is applied and any decrease in the beam quality. In addition, because, as for the direction of the x axis, the incident laser light passes through a thermal lens having a thermal lens effect with respect to a direction perpendicular to the direction of heat sinking 2 m times, and, as for the direction of the x axis, also passes through a thermal lens having another thermal lens effect with respect to a direction perpendicular to the direction of heat sinking 2 m times, there causes no difference between the thermal lens with respect to the direction of the x axis and the other thermal lens with respect to the direction of the y axis and the astigmatism can be compensated for.

Furthermore, because the cascade connection increases the number of square rods, the total gain to be given to the laser light is increased and the efficiency of such a laser apparatus to which the pumping module is applied, as a laser oscillator or a laser amplifier, is improved.

As mentioned above, in accordance with this embodiment 3, the pumping module is provided with a first polarization rotating optical system including seventh and eighth square rods 31 and 32 having an optical axis 26 and each having a couple of heat sinking surfaces which are normal to a direction of y axis perpendicular to the optical axis 26, and a first 90-degree polarization rotator 35 having the optical axis 26 in common with the seventh and eighth square rods 31 and 32 and disposed between the seventh and eighth square rods 31 and 32, for rotating the polarization of laser light passing therethrough by 90 degrees; and a second polarization rotating optical system including ninth and tenth square rods 33 and 34 having the optical axis 26 in common with the seventh and eighth square rods 31 and 32 and each having a couple of heat sinking surfaces which are normal to a direction of x axis perpendicular to the optical axis 26 and the direction of the y axis, and a second 90-degree polarization rotator 36 having the optical axis 26 in common with the seventh and eighth square rods 31 and 32 and disposed between the ninth and tenth square rods 33 and 34, for rotating the polarization of laser light passing therethrough by 90 degrees. As a result, the present embodiment offers an advantage of being able to prevent any decrease in the extinction ratio regardless of a variation in the orientation of the birefringence axes of each of the plurality of square rods, and to prevent the occurrence of a difference between a thermal lens with respect to the direction of the x axis and another thermal lens with respect to the direction of the y axis, thereby preventing the occurrence of astigmatism.

Furthermore, in accordance with this embodiment 3, the first polarization rotating optical system is provided with the seventh square rod 31 and the eighth square rod 32 in each of which the laser light is allowed to propagate along a zig-zag optical path between the couple of heat sinking surfaces thereof, and the second polarization rotating optical system is provided with the ninth square rod 33 and the tenth square rod 34 in each of which the laser light is allowed to propagate along a zig-zag optical path between the couple of heat sinking surfaces thereof. As a result, the present embodiment offers another advantage of being able to make the temperature gradients caused in the direction of heat sinking uniform in each of the plurality of square rods, thereby preventing thermal lens effects from being produced.

In addition, in accordance with this embodiment 3, a plurality of pumping modules can be provided so that their optical axes coincide with one another and they are cascaded. As a result, the increased number of square rods can increase the gain to be given to the laser light.

Embodiment 4

In either of embodiments 1 to 3, the pumping module having a transmission optical system that uses one or more 90-degree polarization rotators is explained. In contrast, in accordance with this embodiment 4, a pumping module having a reflection optical system that uses a 45-degree polarization rotator is provided.

Figure 9:
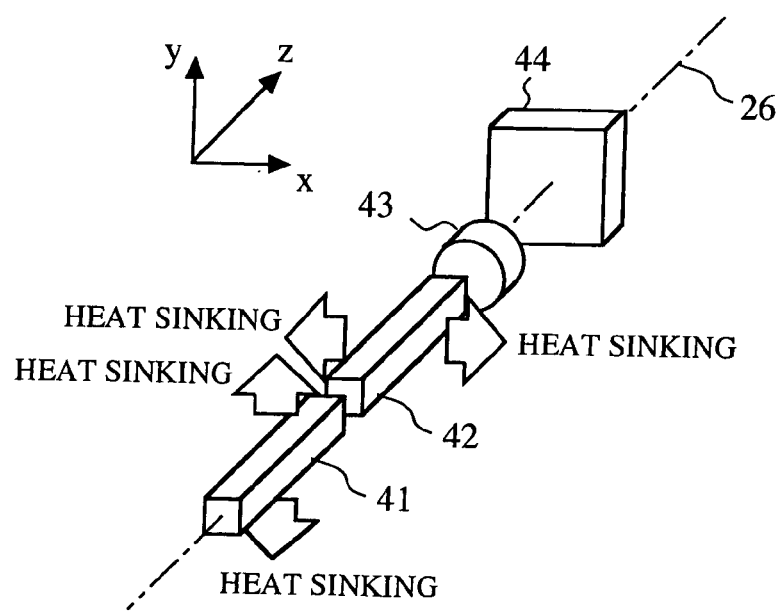
FIG. 9 is a diagram showing the structure of a pumping module according to embodiment 4 of the present invention.

FIG. 9 is a diagram showing the structure of the pumping module according to embodiment 4 of the present invention.

In FIG. 9, reference numeral 41 denotes an eleventh square rod, reference numeral 42 denotes a twelfth square rod, reference numeral 43 denotes a first 45-degree polarization rotator, reference numeral 44 denotes a first total reflection mirror, and reference numeral 26, which is also shown in FIG. 1, denotes an optical axis of the pumping module according to this embodiment 4. The eleventh and twelfth square rods 41 and 42 and the first 45-degree polarization rotator 43 have the optical axis 26 in common. The first total reflection mirror 44 has a reflection surface normal to the optical axis 26. The eleventh square rod 41 has a couple of heat sinking surfaces normal to a direction of y axis, and the twelfth square rod 42 has a couple of heat sinking surfaces normal to a direction of x axis. The first 45-degree polarization rotator 43 is placed between the twelfth square rod 42 and the first total reflection mirror 44.

Next, a description will be made as to the operation of the pumping module of embodiment 4 of the present invention.

Laser light that travels on the optical axis 26 and is incident upon the pumping module passes through the eleventh square rod 41 and the twelfth square rod 42 in succession. The laser light is then incident upon the first 45-degree polarization rotator 43. The first 45-degree polarization rotator 43 rotates the polarization of the forward traveling laser light incident thereupon from the twelfth square rod 42 only by 45 degrees, and emits it towards the first total reflection mirror 44.

The first total reflection mirror 44 reflects the laser light so as to make it incident upon the first 45-degree polarization rotator 43. The first 45-degree polarization rotator 43 further rotates the polarization of the backward traveling laser light incident thereupon from the first total reflection mirror 44 only by 45 degrees, and emits it towards the twelfth square rod 42. The laser light emitted out of the first 45-degree polarization rotator 43 passes through the twelfth 42 square rod and the eleventh square rod 41 in order opposite to the order in which the laser light has passed through them while traveling forwards in the pumping module, and then emerges from the pumping module. Pump light emitted out of a pump light source not shown in the figure is absorbed by the eleventh and twelfth square rods 41 and 42, and a gain is produced, and the laser light traveling forwards and backwards along the optical axis 26 is thus amplified by the eleventh and twelfth square rods 41 and 42.

The pumping module of FIG. 9 will be explained by using a Jones matrix equation, after the manner as mentioned in embodiment 1.

In FIG. 9, it is assumed that the reflectivity of the first total reflection mirror 44 is M, and the Jones matrix of the eleventh square rod 41 is $J_{R41}$ and the Jones matrix of the twelfth square rod 43 is $J_{R42}$. Each of the Jones matrices $J_{R41}$ and $J_{R42}$ is similar to that as shown in the equation (2) described in Embodiment 1.

The Jones matrix $J_{Rot}'$ of the first 45-degree polarization rotator 43 is given by the following equation (10). Because the Jones matrix of the polarization rotator is a rotation matrix, the following relationship: $J_{Rot}' \cdot J_{Rot}' = J_{Rot}$ is established. In other words, when laser light travels forwards and backwards in the pumping module so as to pass through the first 45-degree polarization rotator 43 twice, the first 45-degree polarization serves as a 90-degree polarization rotator as shown in either of Embodiments 1 to 3.

$$J_{Rot}' = \begin{pmatrix} \cos\frac{\pi}{4} & -\sin\frac{\pi}{4} \\ \sin\frac{\pi}{4} & \cos\frac{\pi}{4} \end{pmatrix} \qquad \text{Equation (10)}$$

When taking the order in which the laser light passes through all the components of the pumping module and the above-mentioned Jones matrices into consideration, the Jones matrix $J_{All}$ of the entire pumping module of FIG. 9 is calculated by using the following equation (11).

$$\begin{aligned} J_{All} &= J_{R41} \cdot J_{R42} \cdot J_{Rot}' \cdot M \cdot J_{Rot}' \cdot J_{R42} \cdot J_{R41} \qquad \text{Equation (11)} \\ &= M \cdot J_{R41} \cdot J_{R42} \cdot J_{Rot}' \cdot J_{Rot}' \cdot J_{R42} \cdot J_{R41} \\ &= M \cdot J_{R41} \cdot J_{R42} \cdot J_{Rot} \cdot J_{R42} \cdot J_{R41} \\ &= M \begin{pmatrix} 0 & -1 \\ 1 & 0 \end{pmatrix} \end{aligned}$$

As can be seen from the equation (11), even in the case of the pumping module having a reflection optical system as shown in FIG. 9, the pumping module operates in such a manner that the outgoing polarized light vector $(E_{Out}, E_{yout})^T$ must be perpendicular to the incoming polarized light vector $(E_x, E_y)^T$ given by the equation (1), like that of embodiment 1.

In general, when the 90-degree rotation matrix $J_{Rot}$ ($=J_{Rot}' \cdot J_{Rot}'$) given by the equation (3) is multiplied by an arbitrary matrix Q having 2 rows and 2 columns from the left side thereof, and is also multiplied by the transpose QT of the matrix Q from the right side thereof, the following equation: $Q \cdot J_{Rot} \cdot Q^T = |Q| \cdot J_{Rot}$ is obtained.

The result of the above matrix multiplication shows that the result is equal to the 90-degree rotation matrix $J_{rot}$ itself multiplied by a number and the actions of the arbitrary matrix Q and the transpose of the matrix Q on the 90-degree rotation matrix $J_{Rot}$ result in that only the determinant of the matrix Q appears as the coefficient of the 90-degree rotation matrix $J_{Rot}$. Because the coefficient |Q| doesn't have an essential influence on the arbitrary two-dimension vector (especially, because the Jones matrix is a so-called unitary matrix, the absolute value of the determinant of the matrix becomes 1), only the 90-degree rotation matrix $J_{Rot}$ is applied to the two-dimension vector while the two-dimension vector is not influenced by the matrix Q.

In accordance with this embodiment 4, because the pumping module has the reflection optical system based on the above-mentioned idea and the plurality of optical components act on the polarization of the laser light traveling backward in the pumping module in order opposite to that in which they act on the laser light traveling forward in the pumping module, the above matrix multiplication is implemented optically.

Furthermore, thermal lens effects are compensated for.

In other words, the thermal lens effect with respect to the direction of the x axis and the thermal lens effect with respect to the direction of the y axis are counterbalanced and no astigmatism occurs because the laser light passes through the eleventh square rod 41, in which heat is dissipated in the direction of the y axis, twice in the forward and backward directions, and also passes through the twelfth square rod 42, in which heat is dissipated in the direction of the z axis, twice in the forward and backward directions.

Thus, the pumping module having the reflection optical system of FIG. 9 provides the same results as those provided by that of embodiment 1.

Particularly, because the pumping module of FIG. 9 consists of the reflection optical system, the same pumping need not be performed on the plurality of different square rods as long as the Jones matrix $J_{R41} \cdot J_{R42}$ for the laser light traveling backwards doesn't change faster than the light speed with respect to the Jones matrix $J_{R42} \cdot J_{R41}$ for the laser light traveling forwards (i.e., as long as no difference occurs between both the Jones matrices) while the loss increases due to the reflectivity M of the first total reflection mirror 44 and so on.

An example of the structure of such a laser apparatus, to which the pumping module of FIG. 9 is applied, as a laser oscillator or a laser amplifier, will be explained.

<Laser Oscillator 1>

Figure 10:
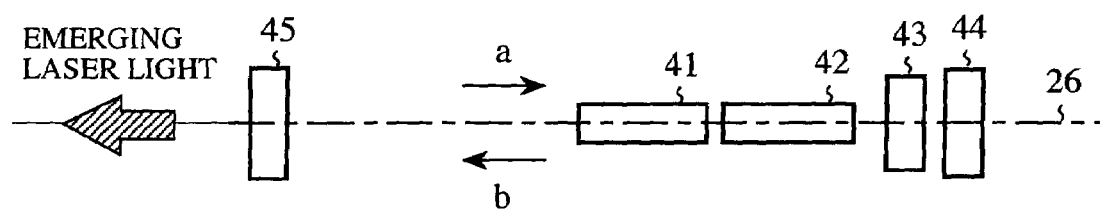
FIG. 10 is a diagram showing the structure of a laser oscillator to which the pumping module according to embodiment 4 of the present invention is applied.

FIG. 10 is a diagram showing the structure of a laser oscillator to which the pumping module according to embodiment 4 of the present invention is applied. The same reference numerals as shown in FIG. 9 denote the same components or like components.

In FIG. 10, reference numeral 45 denotes a partial reflection mirror that is placed on an optical axis, 26 together with the first 45-degree polarization rotator 43 and the first total reflection mirror 44 so that the eleventh and twelfth square rods 41 and 42 are sandwiched between the first 45-degree polarization rotator 43 and the partial reflection mirror 45. The partial reflection mirror 45 has a reflection surface normal to the optical axis 26. The space between the partial reflection mirror 45 and the first total reflection mirror 44 is a cavity. A arrow designated by reference character a shows a forward path of the laser light incident upon the pumping module of the laser amplifier, and another arrow designated by reference character b shows a backward path of the laser light that emerges from the pumping module of the laser amplifier.

Next, a description will be made as to the operation of the laser oscillator.

In a case where the pumping module is used as a laser oscillator, laser oscillation is caused when the polarization and phase of the laser light incident upon the pumping module coincide with those of the laser light that has traveled between the total reflection mirror and the partial reflection mirror in the pumping module an even number of times. By adjusting the cavity length of the laser oscillator, the phase of the laser light incident upon the pumping module can be made to coincide with that of the laser light that has traveled between the total reflection mirror and the partial reflection mirror in the pumping module an even number of times. Therefore, a description will be made as to the coincidence between the polarization of the laser light incident upon the pumping module can be made to coincide with that of the laser light that has traveled between the total reflection mirror and the partial reflection mirror in the pumping module an even number of times.

As shown in FIG. 10, when the laser light passing through the partial reflection mirror 45 along the forward path a is linearly polarized in the direction of the y axis, for example, as described in the explanation of the operation of the pumping module of FIG. 9, after the laser light initially traveling along the forward path a has traveled between the partial reflection mirror and the total reflection mirror for the first time, the laser light is linearly polarized in the direction of the x axis. The laser light thus linearly polarized in the direction of the x axis and traveling along the backward path b is then reflected by the partial reflection mirror 45 and travels along the forward direction a while being linearly polarized in the direction of the x axis. After that, when the laser light traveling along the forward path a travels between the partial reflection mirror and the total reflection mirror for the second time, it is linearly polarized in the direction of the y axis.

Therefore, because the polarization and phase of the laser light incident upon the pumping module coincide with those of the laser light that has traveled between the total reflection mirror and the partial reflection mirror in the pumping module (2 multiplied by a natural number) times, i.e., an even number of times, laser oscillation is generated within the cavity between the partial reflection mirror 45 and the first total reflection mirror 44. The laser light thus caused by the laser oscillation emerges from the partial reflection mirror 45.

The above-mentioned operations and polarization statuses are summarized as follows: traveling along the forward path a (linearly polarized in the direction of the y axis)=>further traveling forwards and then backwards in the pumping module=>traveling along the backward path b (linearly polarized in the direction of the x axis)=>reflected by the partial reflection mirror 45=>traveling along the forward path a (linearly polarized in the direction of the x axis) =>further traveling forwards and then backwards in the pumping module=>traveling along the backward path b (linearly polarized in the direction of the y axis)=>reflected by the partial reflection mirror 45=>traveling along the forward path a (linearly polarized in the direction of the y axis)=>. . .

<Laser oscillator 2>

An addition of a second 45-degree polarization rotator to the structure of FIG. 10 makes it possible for the laser oscillator to generate laser light with one round trip.

Figure 11:
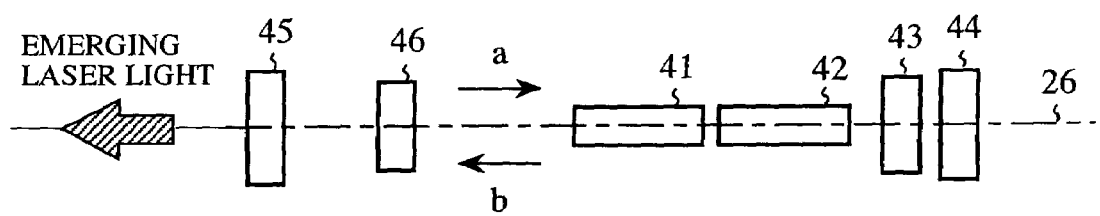
FIG. 11 is a diagram showing the structure of a laser oscillator to which the pumping module according to embodiment 4 of the present invention is applied.

FIG. 11 is a diagram showing the structure of such a laser oscillator to which the pumping module according to embodiment 4 of the present invention is applied. In the figure, the same reference numerals as shown in FIGS. 1, 9, and 10 denote the same components or like components.

In FIG. 11, reference numeral 46 denotes a second 45-degree polarization rotator placed on an optical axis 26 and between a partial reflection mirror 45 and an eleventh square rod 41.

Next, a description will be made as to the operation of the laser oscillator.

Laser light linearly polarized in a direction of y axis travels along a forward path a, and is then reflected by a total reflection mirror and travels backwards. The laser light traveling along a backward path b is thus linearly polarized in a direction of x axis. The polarization of the laser light traveling along the backward path b is further rotated only by 45 degrees with respect to the direction of the x axis by the second 45-degree polarization rotator 46. The polarization of the laser light is further rotated only by 45 degrees with respect to the direction of the x axis by the second 45-degree polarization rotator 46 after reflected by the partial reflection mirror 45.

Therefore, after the laser light traveling along the backward path b and linearly polarized in the direction of the x axis has passed through the second 45-degree polarization rotator 46 twice, the polarization of the laser light is finally rotated by 90 degrees with respect to the direction of the x axis and therefore the laser light is linearly polarized in the direction of the y axis when traveling along the forward path a for the second time. Thus, in the laser oscillator of FIG. 11, the polarization and phase of the laser light incident upon the pumping module coincide with those of the laser light that has traveled between the total reflection mirror and the partial reflection mirror in the pumping module only once, and laser oscillation is generated within the cavity between the first total reflection mirror 44 and the partial reflection mirror 45. The laser light thus caused by the laser oscillation emerges from the partial reflection mirror 45.

The above-mentioned operation of the laser oscillator is summarized as follows: traveling along the forward path a (linearly polarized in the direction of the y axis)=>further traveling forwards and then backwards in the pumping module=>traveling along the backward path b (linearly polarized in the direction of the x axis)=>passing through the second 45-degree polarization rotator 46=>reflected by the partial reflection mirror 45=>passing through the second 45-degree polarization rotator 46=>traveling along the forward path a (linearly polarized in the direction of the y axis)=>. . .

<Laser Oscillator 3>

Figure 12:
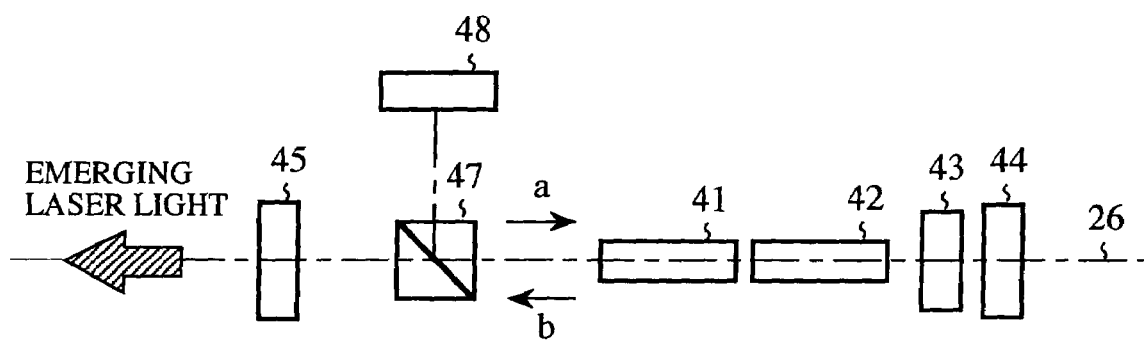
FIG. 12 is a diagram showing the structure of a laser oscillator to which the pumping module according to embodiment 4 of the present invention is applied.

FIG. 12 is a diagram showing the structure of a laser oscillator to which the pumping module according to embodiment 4 of the present invention is applied. In the figure, the same reference numerals as shown in FIGS. 1, 9, and 10 denote the same components or like components.

In FIG. 12, reference numeral 47 denotes a polarizer through which laser light linearly polarized in a direction of x axis can pass, the polarizer being placed on an optical axis 26 and between a partial reflection mirror 45 and an eleventh square rod 41, and reference numeral 48 denotes a second total reflection mirror for totally reflecting laser light reflected by the polarizer 47.

The polarizer 47 allows incident laser light (laser light of a predetermined polarization) linearly polarized in the direction of the x axis to pass therethrough while making the emerging direction of the laser light coincide with the incident direction, and reflects incident laser light linearly polarized in the direction of the y axis (laser light of a polarization perpendicular to the predetermined polarization) in a direction perpendicular to the optical axis 26. The second total reflection mirror 48 is disposed in this direction perpendicular to the optical axis 26, and can reflect the laser light reflected by the polarizer 47 towards the polarizer 47.

Next, a description will be made as to the operation of the laser oscillator.

Laser light linearly polarized in the direction of the y axis travels along a forward path a, and is then reflected by the first total reflection mirror and travels backwards. The laser light traveling along a backward path b is thus linearly polarized in the direction of the x axis. Because the laser light traveling along the backward path b is linearly polarized in the direction of the x axis, it passes through the polarizer 47 and is then reflected by the partial reflection mirror 45. After that, the laser light passes through the polarizer 47 again and reaches the forward path a. At this time, because the laser light traveling along the forward path a is linearly polarized in the direction of the x axis, the laser light becomes the one linearly polarized in the direction of the y axis while traveling along the backward path b after reflected by the first total reflection mirror and traveling backwards for the second time.

Because the laser light traveling along the backward path b is linearly polarized in the direction of the y axis, it is reflected in a direction perpendicular to the optical axis 26 by the polarizer 47 so that it is directed towards the second total reflection mirror 48, and is then reflected towards the polarizer 47 by the total reflection mirror 48 and is further reflected by the polarizer 47. The laser light is finally linearly polarized in the direction of the y axis and travels along the forward path a.

Thus, in the laser oscillator of FIG. 12, the polarization and phase of the laser light incident upon the pumping module coincide with those of the laser light that has traveled between the first total reflection mirror and the partial reflection mirror in the pumping module twice, and laser oscillation can be generated within the cavity between the first total reflection mirror 44 and the partial reflection mirror 45. The laser light thus caused by the laser oscillation emerges from the partial reflection mirror 45.

The above-mentioned operation of the laser oscillator is summarized as follows: traveling along the forward path a (linearly polarized in the direction of the y axis)=>further traveling forwards and then backwards in the pumping module=>traveling along the backward path b (linearly polarized in the direction of the x axis)=>passing through the polarizer 47=>reflected by the partial reflection mirror 45=>passing through the polarizer 47=>traveling along the forward path a (linearly polarized in the direction of the x axis)=>further traveling forwards and then backwards in the pumping module=>traveling along the backward path b (linearly polarized in the direction of the y axis)=>reflected by the polarizer 47=>reflected by the second total reflection mirror 48=>reflected by the polarizer 47=>traveling along the forward path a (linearly polarized in the direction of the y axis)=>. . .

<Laser Amplifier>

Next, a laser amplifier that uses the pumping module of FIG. 9 will be explained.

Figure 13:
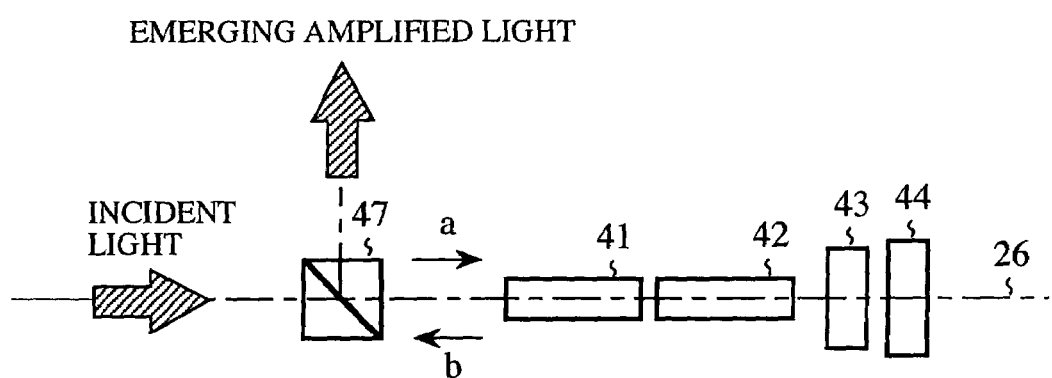
FIG. 13 is a diagram showing the structure of a laser amplifier to which the pumping module according to embodiment 4 of the present invention is applied.

FIG. 13 is a diagram showing the structure of the laser amplifier to which the pumping module according to embodiment 4 of the present invention is applied. In the figure, the same reference numerals as shown in FIGS. 1, 9, and 10 denote the same components or like components.

Next, a description will be made as to the operation of the laser amplifier.

When incident light linearly polarized in the direction of the x axis passes through the polarizer 47, the light travels along the forward path a within the pumping module while it is linearly polarized in the direction of the x axis. The laser light that has returned from the pumping module and travels along the backward path b is linearly polarized in the direction of the y axis because of the orthogonal action of the pumping module. The laser light linearly polarized in the direction of the y axis is reflected in a direction perpendicular to the optical axis 26 by the polarizer 47, and emerges from the laser amplifier as an emerging laser light amplified by the pumping module.

Thus, the laser amplifier of FIG. 13 isolates the incident light and the emerging light from each other by using the polarizer 47 according to the fact that the laser light traveling along the forward path a has a polarization perpendicular to that of the laser light traveling along the backward path b.

The above-mentioned operation of the laser amplifier is summarized as follows: incident light (linearly polarized in the direction of the x axis)=>passing through the polarizer 47=>traveling along the forward path a (linearly polarized in the direction of the x axis)=>further traveling forwards and then backwards in the pumping module=>traveling along the backward path b (linearly polarized in the direction of the y axis)=>reflected by the polarizer 47=>emerging light (linearly polarized in the direction of the y axis).

As previously explained, the pumping module having the reflection optical system includes one eleventh square rod 41 and one twelfth square rod 42. However, this embodiment 4 is not limited to this configuration. In other words, both the number of eleventh square rods 41 and the number of twelfth square rods 42 are not limited to 1. Equal numbers of eleventh square rods 41 and twelfth square rods 42 can be provided so that they are cascaded. This variant provides the same advantages.

In the case of this cascade connection, equal numbers of square rods in which heat is dissipated in the direction of the x axis and square rods in which heat is dissipated in the direction of the y axis only have to be provided and the locations of the equal numbers of square rods in which heat is dissipated in the direction of the x axis and square rods in which heat is dissipated in the direction of the y axis are not particularly restricted and can be arbitrarily determined.

For example, when the pumping module is provided with one square rod in which heat is dissipated in the direction of the x axis and one square rod in which heat is dissipated in the direction of the y axis, the arrangement of the two square rods can include the following two patterns according to the direction of heat sinking when viewed from the incident side of light: a first pattern; the direction of the x axis and the direction of the y axis (X·Y), and a second pattern; the direction of the y-axis and the direction of the x axis (Y·X). When the pumping module is provided with two square rods in which heat is dissipated in the direction of the x axis and two square rods in which heat is dissipated in the direction of the y axis, the arrangement of the four square rods can be any one of the following six patterns according to the direction of heat sinking when viewed from the incident side of light: X·X·Y·Y, X·Y·X·Y, X·Y·Y·X, Y·Y·X·X, Y·X·Y·X, and Y·X·X·Y.

In a case where the pumping module is provided with three, four, or five, . . . square rods in which heat is dissipated in the direction of the x axis and three, four, or five, . . .

square rods in which heat is dissipated in the direction of the y axis, the four or more square rods can be similarly configured.

In addition, as explained in Embodiment 1, each of the eleventh and twelfth square rods 41 and 42 can be constructed so that the laser light propagates along a zig-zag optical path which is bent several times in the direction of heat sinking. In this case, the same advantages are provided.

Furthermore, it is also possible to apply the technique as disclosed in Embodiment 2 to the pumping module of this embodiment 4. In other words, the pumping module can be constructed of one square rod in which an eleventh square rod 41 and a twelfth square rod 42 are integrally formed and from one half of which heat is dissipated in a direction perpendicular to that in which heat is dissipated from the remaining half of the single square rod, a first 45-degree polarization rotator, and a first total reflection mirror. This variant offers the same advantages.

At least one integrally formed square rod is adequate for forming the pumping module when heat is dissipated from one half of the integrally formed square rod in a direction perpendicular to that in which heat is dissipated from the remaining half of the single square rod. In this case, the pumping module is constructed of one or more such square rods, a first 45-degree polarization rotator, and a total reflection mirror. Each of the one or more square rods is so constructed that heat is dissipated from one half of each square rod in a direction perpendicular to that in which heat is dissipated from the remaining half of each square rod. The order of the directions of heat sinking is not limited, and the number of square rod halves in which heat is dissipated in the direction of the x axis only has to be equal to the number of square rod halves in which heat is dissipated in the direction of the y axis.

As mentioned above, in accordance with this embodiment 4, the pumping module is provided with a reflection square rod group including one or more eleventh square rods 41 having an optical axis 26 and each having a couple of heat sinking surfaces which are normal to a direction of y axis perpendicular to the optical axis 26 and the same number of twelfth square rods 42 as that of eleventh square rods 41, having the optical axis 26 in common with the one or more eleventh square rods and each having a couple of heat sinking surfaces which are normal to a direction of x axis perpendicular to the optical axis 26 and the direction of the y axis; a first total reflection mirror 44 for reflecting laser light emitted out of the reflection square rod group towards the reflection square rod group; and a first 45-degree polarization rotator 43 having the optical axis in common with the one or more eleventh square rods and disposed between the reflection square rod group and the first total reflection mirror 44, for rotating a polarization of the laser light passing therethrough by 45 degrees. As a result, the present embodiment offers an advantage of being able to prevent any decrease in the extinction ratio regardless of a variation in the orientation of the birefringence axes of each of the plurality of square rods, and to prevent the occurrence of a difference between a thermal lens with respect to the direction of the x axis and another thermal lens with respect to the direction of the y axis, thereby preventing the occurrence of astigmatism.

Furthermore, in accordance with this embodiment 4, the reflection square rod group is provided with the one or more eleventh square rods 41 and the one or more twelfth square rods 42 in each of which the laser light is allowed to propagate along a zig-zag optical path between the couple of heat sinking surfaces thereof. As a result, the present embodiment offers an advantage of being able to make the temperature gradients caused in the direction of heat sinking uniform in each of the plurality of square rods, thereby preventing thermal lens effects from being produced.

In addition, in accordance with this. embodiment 4, equal numbers of the one or more eleventh square rods 41 and the one or more twelfth square rods 42 are integrally formed in the reflection square rod group. As a result, the present embodiment offers an advantage of being able to facilitate the alignment of each of the plurality of square rods and to omit processes such as grinding and coating of each of the plurality of square rods, thereby reducing the cost of the pumping module.

Furthermore, in accordance with this embodiment 4, a laser oscillator is provided with the pumping module and a partial reflection mirror 45 that pairs up with a first total reflection mirror 44 of the pumping module and is disposed so that a reflection square rod group and a first polarization rotator 43 are sandwiched between the first total reflection mirror of the pumping module and the partial reflection mirror and that is perpendicular to an optical axis 26 of the pumping module. As a result, the present embodiment offers another advantage of being able to prevent any decrease in the efficiency of energy and any decrease in the beam quality and providing a laser oscillator that does not have to use a mechanism of compensating for astigmatism.

In addition, in accordance with this embodiment 4, the laser oscillator includes a second 45-degree polarization rotator 46 having the optical axis 26 in common with the pumping module and disposed between the partial reflection mirror 45 and the pumping module, for rotating a polarization of laser light passing therethrough by 45 degrees. As a result, the present embodiment offers another advantage of being able to prevent any decrease in the efficiency of energy and any decrease in the beam quality and providing a laser oscillator that does not have to use a mechanism of compensating for astigmatism.

Furthermore, in accordance with this embodiment 4, the laser oscillator includes a polarizer 47 disposed on the optical axis 26 between the partial reflection mirror 45 and the pumping module, for allowing laser light linearly polarized in the direction of the x axis to pass therethrough, and for reflecting laser light linearly polarized in the direction of the y axis perpendicular to the polarization in the direction of x axis of the former laser light in a direction perpendicular to the optical axis 26, and a second total reflection mirror 48 for reflecting the laser light reflected by the polarizer 47 towards the polarizer 47. As a result, the present embodiment offers another advantage of being able to prevent any decrease in the efficiency of energy and any decrease in the beam quality and providing a laser oscillator that does not have to use a mechanism of compensating for astigmatism.

In addition, in accordance with this embodiment 4, a laser amplifier includes: a pumping module and a polarizer 47 disposed on the optical axis 26 of the pumping module, for allowing laser light linearly polarized in the direction of the x axis to pass therethrough, and for reflecting laser light linearly polarized in the direction of the y axis perpendicular to the polarization in the direction of x axis of the former laser light in a direction perpendicular to the optical axis 26, and the laser light linearly polarized in the direction of the x axis is input to the pumping module by way of the polarizer 47. As a result, the present embodiment offers another advantage of being able to prevent any decrease in the efficiency of energy and any decrease in the beam quality and providing a laser amplifier that does not have to use a mechanism of compensating for astigmatism.

INDUSTRIAL APPLICABILITY

As mentioned above, a pumping module in accordance with the present invention is suitable for a laser oscillator and a laser amplifier for use in spaceborne laser equipment and laser equipment intended for machining.

The invention claimed is:

1. A pumping module for making laser light pass through square rods each having a couple of heat sinking surfaces opposite to each other and shaped like a square pillar so as to provide a gain for the laser light, said pumping module comprising:
    a first square rod group including a first square rod having an optical axis and having a couple of heat sinking surfaces normal to a first axis perpendicular to said optical axis and a second square rod having said optical axis in common with said first square rod and having a couple of heat sinking surfaces normal to a second axis perpendicular to said optical axis and said first axis;
    a second square rod group including a third square rod having said optical axis in common with said first square rod and having a couple of heat sinking surfaces normal to said first axis and a fourth square rod having said optical axis in common with said first square rod and having a couple of heat sinking surfaces normal to said second axis; and
    a 90-degree polarization rotator disposed between said first and second square rod groups and having said optical axis in common with said first through fourth square rods, for rotating a polarization of said laser light passing therethrough by 90 degrees.

2. The pumping module according to claim 1, wherein said first square rod group is provided with said first square rod and said second square rod in each of which the laser light is allowed to propagate along a zig-zag optical path between the couple of heat sinking surfaces thereof, and said second square rod group is provided with said third square rod and said fourth square rod in each of which the laser light is allowed to propagate along a zig-zag optical path between the couple of heat sinking surfaces thereof.

3. The pumping module according to claim 1, wherein said first square rod group is provided with said first square rod and said second square rod which are integrally formed, and said second square rod group is provided with said third square rod and said fourth square rod which are integrally formed.

4. A pumping module for making laser light pass through square rods each having a couple of heat sinking surfaces opposite to each other and shaped like a square pillar so as to provide a gain for the laser light, wherein said module comprises:
    a first polarization rotating optical system including first and second square rods having an optical axis and each having a couple of heat sinking surfaces which are normal to a first axis perpendicular to said optical axis, and a first 90 degree polarization rotator having said optical axis in common with said first and second square rods and disposed between said first and second square rods, for rotating a polarization of said laser light passing therethrough by 90 degrees; and
    a second polarization rotating optical system including third and fourth square rods having said optical axis in common with said first and second square rods and each having a couple of heat sinking surfaces which are normal to a second axis perpendicular to said optical axis and said first axis, and a second 90-degree polarization rotator having said optical axis in common with said first and second square rods and disposed between said third and fourth square rods, for rotating a polarization of said laser light passing therethrough by 90 degrees.

5. The pumping module according to claim 4, wherein said first polarization rotating optical system is provided with said first square rod and said second square rod in each of which the laser light is allowed to propagate along a zig-zag optical path between the couple of heat sinking surfaces thereof, and said second polarization rotating optical system is provided with said third square rod and said fourth square rod in each of which the laser light is allowed to propagate along a zig-zag optical path between the couple of heat sinking surfaces thereof.

6. A pumping module for making laser light pass through square rods each having a couple of heat sinking surfaces opposite to each other and shaped like a square pillar so as to provide a gain for the laser light, wherein said module comprises:
    a reflection square rod group including one or more first square rods having an optical axis and each having a couple of heat sinking surfaces which are normal to a first axis perpendicular to said optical axis and a same number of second square rods as that of first square rods, having said optical axis in common with said one or more first square rods and each having a couple of heat sinking surfaces which are normal to a second axis perpendicular to said optical axis and said first axis;
    a first total reflection mirror for reflecting said laser light emitted out of said reflection square rod group back towards said reflection square rod group; and
    a first 45-degree polarization rotator having said optical axis in common with said one or more first square rods and disposed between said reflection square rod group and said first total reflection mirror, for rotating a polarization of said laser light passing therethrough by 45 degrees.

7. The pumping module according to claim 6, wherein said reflection square rod group has equal numbers of said one or more first square rods and said one or more second square rods which are integrally formed.

8. The pumping module according to claim 6, wherein said reflection square rod group is provided with said one or more first square rods and said one or more second square rods in each of which the laser light is allowed to propagate along a zig-zag optical path between the couple of heat sinking surfaces thereof.

9. A laser oscillator comprising:
    a pumping module provided with a first square rod group including a first square rod having an optical axis and having a couple of heat sinking surfaces normal to a first axis perpendicular to said optical axis and a second square rod having said optical axis in common with said first square rod and having a couple of heat sinking surfaces normal to a second axis perpendicular to said optical axis and said first axis, and a second square rod group including a third square rod having said optical axis in common with said first square rod and having a couple of heat sinking surfaces normal to said first axis and a fourth square rod having said optical axis in common with said first square rod and having a couple of heat sinking surfaces normal to said second axis, and a 90-degree polarization rotator disposed between said first and second square rod groups and having said optical axis in common with said first through fourth square rods, for rotating a polarization of said laser light passing therethrough by 90 degrees;

a total reflection mirror that is perpendicular to said optical axis of said pumping module; and a partial reflection mirror that is disposed so that said pumping module is sandwiched between said partial reflection mirror and said total reflection mirror and that is perpendicular to said optical axis.

10. A laser oscillator comprising:

a pumping module provided with a first polarization rotating optical system including first and second square rods having an optical axis and each having a couple of heat sinking surfaces which are normal to a first axis perpendicular to said optical axis, and a first 90-degree polarization rotator having said optical axis in common with said first and second square rods and disposed between said first and second square rods, for rotating a polarization of said laser light passing therethrough by 90 degrees, and a second polarization rotating optical system including third and fourth square rods having said optical axis in common with said first and second square rods and each having a couple of heat sinking surfaces which are normal to a second axis perpendicular to said optical axis and said first axis, and a second 90-degree polarization rotator having said optical axis in common with said first and second square rods and disposed between said third and fourth square rods, for rotating a polarization of said laser light passing therethrough by 90 degrees;

a total reflection mirror that is perpendicular to said optical axis of said pumping module; and a partial reflection mirror that is disposed so that said pumping module is sandwiched between said partial reflection mirror and said total reflection mirror and that is perpendicular to said optical axis.

11. A laser oscillator comprising:

a pumping module provided with a reflection square rod group including one or more first square rods having an optical axis and each having a couple of heat sinking surfaces which are normal to a first axis perpendicular to said optical axis and a same number of second square rods as that of first square rods, having said optical axis in common with said one or more first square rods and each having a couple of heat sinking surfaces which are normal to a second axis perpendicular to said optical axis and said first axis, a first total reflection mirror for reflecting said laser light emitted out of said reflection square rod group back towards said reflection square rod group, and a first 45-degree polarization rotator having said optical axis in common with said one or more first square rods and disposed between said reflection square rod group and said first total reflection mirror, for rotating a polarization of said laser light passing therethrough by 45 degrees; and a partial reflection mirror that pairs up with said first total reflection mirror of said pumping module and is disposed so that said reflection square rod group and said first 45-degree polarization rotator are sandwiched between said first total reflection mirror of said pumping module and said partial reflection mirror and that is perpendicular to an optical axis of said pumping module.

12. The laser oscillator according to claim 11, wherein said laser oscillator comprises a second 45-degree polarization rotator having the optical axis in common with said pumping module and disposed between said partial reflection mirror and said pumping module, for rotating a polarization of said laser light passing therethrough by 45 degrees.

13. The laser oscillator according to claim 11, wherein said laser oscillator comprises a polarizer disposed on said optical axis between said partial reflection mirror and said pumping module, for allowing laser light of a predetermined polarization to pass therethrough, and for reflecting laser light of a polarization perpendicular to the former laser light of the predetermined polarization in a direction perpendicular to said optical axis, and a second total reflection mirror for reflecting the laser light reflected by said polarizer towards said polarizer.

14. A laser amplifier comprising a pumping module provided with a first square rod group including a first square rod having an optical axis and having a couple of heat sinking surfaces normal to a first axis perpendicular to said optical axis and a second square rod having said optical axis in common with said first square rod and having a couple of heat sinking surfaces normal to a second axis perpendicular to said optical axis and said first axis, a second square rod group including a third square rod having said optical axis in common with said first square rod and having a couple of heat sinking surfaces normal to said first axis and a fourth square rod having said optical axis in common with said first square rod and having a couple of heat sinking surfaces normal to said second axis, and a 90-degree polarization rotator disposed between said first and second square rod groups and having said optical axis in common with said first through fourth square rods, for rotating a polarization of said laser light passing therethrough by 90 degrees, wherein said amplifier amplifies an input laser light by using said pumping module.

15. A laser amplifier comprising a pumping module provided with a first polarization rotating optical system including first and second square rods having an optical axis and each having a couple of heat sinking surfaces which are normal to a first axis perpendicular to said optical axis, and a first 90-degree polarization rotator having said optical axis in common with said first and second square rods and disposed between said first and second square rods, for rotating a polarization of said laser light passing therethrough by 90 degrees, and a second polarization rotating optical system including third and fourth square rods having said optical axis in common with said first and second square rods and each having a couple of heat sinking surfaces which are normal to a second axis perpendicular to said optical axis and said first axis, and a second 90-degree polarization rotator having said optical axis in common with said first and second square rods and disposed between said third and fourth square rods, for rotating a polarization of said laser light passing therethrough by 90 degrees, wherein said amplifier amplifies an input laser light by using said pumping module.

16. A laser amplifier comprising:

a pumping module provided with a reflection square rod group including one or more first square rods having an optical axis and each having a couple of heat sinking surfaces which are normal to a first axis perpendicular to said optical axis and a same number of second square rods as that of first square rods, having said optical axis in common with said one or more first square rods and each having a couple of heat sinking surfaces which are normal to a second axis perpendicular to said optical axis and said first axis, a first total reflection mirror for reflecting said laser light emitted out of said reflection square rod group back towards said reflection square rod group; and a first 45-degree polarization rotator having said optical axis in common with said one or more first square rods and disposed between said reflection square rod group and said first total reflection mirror, for rotating a polarization of said laser light passing therethrough by 45 degrees; and a polarizer disposed on said optical axis of said pumping module, for allowing laser light of a predetermined polarization to pass therethrough, and for reflecting laser light of a polarization perpendicular to the former laser light of the predetermined polarization in a direction perpendicular to said optical axis, the laser light of the predetermined polarization being input to said pumping module by way of said polarizer.

* * * * *